United States Patent
Siomina et al.

(10) Patent No.: US 11,758,448 B2
(45) Date of Patent: Sep. 12, 2023

(54) METHOD FOR DETERMINATION BETWEEN INTRA- AND INTER-FREQUENCY OPERATIONS

(71) Applicant: TELEFONAKTIEBOLAGET LM ERICSSON (PUBL), Stockholm (SE)

(72) Inventors: Iana Siomina, Täby (SE); Muhammad Kazmi, Sundbyberg (SE); Christopher Callender, Kinross (GB)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 343 days.

(21) Appl. No.: 16/626,867

(22) PCT Filed: Jun. 25, 2018

(86) PCT No.: PCT/IB2018/054679
§ 371 (c)(1),
(2) Date: Dec. 26, 2019

(87) PCT Pub. No.: WO2019/003091
PCT Pub. Date: Jan. 3, 2019

(65) Prior Publication Data
US 2020/0178129 A1   Jun. 4, 2020

Related U.S. Application Data

(60) Provisional application No. 62/526,190, filed on Jun. 28, 2017.

(51) Int. Cl.
*H04W 36/00* (2009.01)
*H04W 24/10* (2009.01)
*H04W 48/16* (2009.01)

(52) U.S. Cl.
CPC ....... *H04W 36/0072* (2013.01); *H04W 24/10* (2013.01); *H04W 36/0058* (2018.08);
(Continued)

(58) Field of Classification Search
CPC ......... H04W 36/0072; H04W 36/0058; H04W 36/0094; H04W 48/16; H04W 24/10;
(Continued)

(56) References Cited

U.S. PATENT DOCUMENTS

| 2013/0308481 A1 | 11/2013 | Kazmi et al. |
| 2020/0068420 A1* | 2/2020 | Chen ............ H04W 36/00 |

FOREIGN PATENT DOCUMENTS

| CN | 106304128 A | 1/2017 |
| EP | 2984864 A1 | 2/2016 |

OTHER PUBLICATIONS

Huawei, et al., Discussion on definitions of intra and inter-frequency measurements, R4-1706717, 3GPP TSG-RAN WG4 Meeting NR #2, Qingdao, China, Jun. 27-29, 2017.
(Continued)

*Primary Examiner* — Nam T Huynh

(57) ABSTRACT

The solution outlined in this disclosure is a method for determining intra-frequency operations and inter-frequency operations, the method comprises obtaining a first measurement resource of a first cell as a reference measurement resource, obtaining a second measurement resource of a second cell, the second measurement resource of the second cell and the first measurement resource of the first cell are of the same type, and determining whether the second cell operates on an intra-frequency carrier or an inter-frequency carrier by comparing the reference measurement resource to the second measurement resource of the second cell. The method may be carried out in a user equipment or a network node.

25 Claims, 18 Drawing Sheets

(52) U.S. Cl.
CPC ... *H04W 36/0085* (2018.08); *H04W 36/0094* (2013.01); *H04W 48/16* (2013.01)

(58) Field of Classification Search
CPC ......... H04W 36/0088; H04W 36/0085; H04W 36/0061
See application file for complete search history.

(56) References Cited

OTHER PUBLICATIONS

CATT, Discussion on definitions of intra-frequency and inter-frequency for NR, R4-1706584, 3GPP TSG-RAN WG4 Meeting NR AH#2, Qingdao, China, Jun. 27-29, 2017.
Ericsson, Analysis of Intra-frequency and Inter-frequency Measurement Definitions, R4-1708384, 3GPP TSG RAN WG4 Meeting #84, Berlin, Germany, Aug. 21-25, 2017.
Huawei, et al., Measurement gaps and gap control information for SS and CSI-RS, R2-1706733, 3GPP TSG-RAN NG2 NR Ad Hoc, Qingdao, China, Jun. 27-29, 2017.
Huawei, Discussion on UE measurements in LTE, R4-060450, 3GPP TSG-RAN Working Group 4 (Radio) meeting #39, Shanghai, China, May 8-12, 2006.
Samsung, Measurement based on CSI-RS for L3 mobility, R1-1710638, 3GPP TSG RAN WG1 NR Ad-Hoc#2, Qingdao, China, Jun. 27-30, 2017.
RAN WG4, LS on definitions of intra and inter-frequency measurements, R4-1706719, 3GPP TSG-RAN WG4 Meeting #2, Qingdao, China, Jun. 27-29, 2017.
NTT Docomo, Inc., Discussion on remaining details on multiple SS block transmissions in wideband CC for NR, R1-1711059, 3GPP TSG RAN WG1 NR Ad-Hoc#2, Qingdao, P.R. China, Jun. 27-30, 2017.

* cited by examiner

METHOD FOR DETERMINATION BETWEEN INTRA- AND INTER-FREQUENCY OPERATIONS

This application is a 371 of International Application No. PCT/IB2018/054679, filed Jun. 25, 2018, which claims the benefit of U.S. Application No. 62/526,190, filed Jun. 28, 2017, the disclosures of which are fully incorporated herein by reference.

TECHNICAL FIELD

Particular embodiments relate to the field of differentiation between intra- and inter-frequency operations; and more specifically, to methods, apparatus and systems for determining intra-frequency operations and inter-frequency operations for a user equipment in the 5G generation radio.

BACKGROUND

Regarding New Radio (NR) architecture, architecture, the so-called 5G system, from a radio perspective started to be standardized in 3rd Generation Partnership Project (3GPP) and the so-called NR is the name for the radio interface. One of the characteristics is the frequency range going to higher frequencies than LTE, e.g., above 6 GHz, where it is known to have more challenging propagation conditions such as a higher penetration loss. To mitigate some of these effects, multi-antenna technologies such as beamforming will be massively used. Yet another NR characteristic is the use of multiple numerologies in downlink (DL) and uplink (UL) in a cell or for a user equipment (UE) and/or in different frequency bands. Yet another characteristic is the possibility to enable shorter latencies.

NR architecture is being discussed in 3GPP and the current concept is illustrated in FIG. 1, where eNB denotes LTE eNodeB, gNB denotes NR base station (BS) (one NR BS may correspond to one or more transmission/reception points), and the lines between the nodes illustrate the corresponding interfaces which are under discussion in 3GPP.

Further, FIG. 2 illustrates deployment scenarios with NR BS which are discussed in 3GPP. Both standalone and non-standalone NR deployments will be standardized in 3GPP. The standalone deployments may be single or multi-carrier (e.g., NR carrier aggregation (CA) or dual connectivity with NR primary cell (PCell) and NR primary secondary cell (PSCell)). The non-standalone deployments are currently meant to describe a deployment with LTE PCell and NR PSCell (there may also be one or more LTE secondary cells (SCells) and one or more NR SCells).

The following deployment options are explicitly captured in NR Work Item Description [RP-170847, New WID on New Radio Access Technology, NTT DoCoMo, March 2018]:

This work item is aimed at supporting the following connectivity options:
  For single connectivity option:
    NR connected to 5G-Core Network (CN) (Option 2 in TR 38.801 section 7.1).
  For Dual Connectivity options:
    E-UTRA-NR DC via EPC where the E-UTRA is the master (Option 3/3a/3x in TR 38.801 section 10.1.2);
    E-UTRA-NR DC via 5G-CN where the E-UTRA is the master (Option 7/7a/7x in TR 38.801 section 10.1.4);
    NR-E-UTRA DC via 5G-CN where the NR is the master (Option 4/4A in TR 38.801 section 10.1.3); and
    Work on Option 4/4A will be started after the work on Option 2, 3 series and 7 series are completed.
  Dual Connectivity (DC) between E-UTRA and NR, for which the priority is where E-UTRA is the master and the second priority is where NR is the master, and Dual Connectivity within NR.

FIG. 3 illustrates multiple measurement scenarios of intra-frequency and inter-frequency UE operations. The UE performs intra-frequency operations (e.g., radio link monitoring (RLM), intra-frequency measurements, intra-frequency system information (SI) reading, intra-frequency cell identification, etc.) and inter-frequency/inter-radio access technology (RAT) operations (e.g., inter-frequency measurements, inter-frequency SI reading, inter-frequency cell identification, etc.).

To perform inter-frequency/inter-RAT operation, UE typically needs measurement gaps, while for intra-frequency operation measurement gaps are generally not needed, except for bandwidth-limited further enhancements for machine-type communications (FeMTC) UEs. Gap patterns with periodicity 40 ms or 80 ms are used in LTE. For example, in 36.300, intra-frequency neighbor (cell) measurements and inter-frequency neighbor (cell) measurements are defined as hereafter.

Regarding intra-frequency neighbor (cell) measurements, neighbor cell measurements are performed by the UE are intra-frequency measurements when the current and target cell operates on the same (serving) carrier frequency. Regarding inter-frequency neighbor (cell) measurements, neighbor cell measurements are performed by the UE are inter-frequency measurements when the neighbor cell operates on a different carrier frequency, compared to the current cell.

Whether a measurement is non-gap assisted or gap assisted depends on the UE's capability and the current operating frequency. In non-gap assisted scenarios, the UE shall be able to carry out such measurements without measurement gaps. In gap assisted scenarios, the UE should not be assumed to be able to carry out such measurements without measurement gaps. The UE determines whether a particular cell measurement needs to be performed in a transmission/reception gap and the scheduler needs to know whether gaps are needed.

FIG. 3 shows multiple scenarios illustrating whether the target cell operates on an intra-frequency or inter-frequency carrier and whether the measurement is non-gap assisted or gap assisted.

Regarding Scenario A, the current cell and the target cell have the same carrier frequency and cell bandwidths. Scenario A is an intra-frequency scenario and the measurement is non-gap assisted.

Regarding Scenario B, the current cell and the target cell have same carrier frequency, and the bandwidth of the target cell is smaller than the bandwidth of the current cell. Scenario B is an intra-frequency scenario and the measurement is non-gap assisted.

Regarding Scenario C, the current cell and the target cell have the same carrier frequency, and the bandwidth of the target cell is larger than the bandwidth of the current cell. Scenario C is an intra-frequency scenario and the measurement is non-gap assisted.

Regarding Scenario D, the current cell and the target cell have different carrier frequencies, and the bandwidth of the target cell is smaller than the bandwidth of the current cell and the bandwidth of the target cell is within the bandwidth of the current cell. Scenario D is an inter-frequency scenario and the measurement is gap-assisted.

Regarding Scenario E, the current cell and the target cell have different carrier frequencies, and the bandwidth of the target cell is larger than the bandwidth of the current cell and the bandwidth of the current cell is within the bandwidth of the target cell. Scenario E is an inter-frequency scenario and the measurement is gap-assisted.

Regarding Scenario F, the current cell and the target cell have different carrier frequencies and non-overlapping bandwidth. Scenario F is an inter-frequency scenario and the measurement is gap-assisted.

Regarding Scenario G, the current cell and the target cell have same carrier frequency, and the operating frequency of the bandwidth reduced low complexity (BL) UE or the UE in Enhanced Coverage is not guaranteed to be aligned with the center frequency of the current cell. Scenario G is an intra-frequency scenario and the measurement is gap assisted.

In LTE, the center frequency of the carrier comprises DC carrier, and physical signals and multicast/broadcast channels (e.g., synchronization signals, positioning reference signal (PRS), physical broadcast channel (PBCH), etc.) are centered with respect to DC.

There currently exists certain challenges. In addition to large bandwidths in NR, synchronization signals and SS blocks are not necessarily centered within a system bandwidth. Furthermore, multiple SS blocks may be configured by the network within a carrier bandwidth, in the same or different time resources (e.g., subframes). How to differentiate between intra- and inter-frequency becomes unclear.

SUMMARY

To address the foregoing problems with existing solutions, disclosed is methods and network nodes for buffer handling utilizing in-band control signaling.

Several embodiments are elaborated in this disclosure. According to a first embodiment, a UE determines one or a set of reference or anchor radio measurement resources (RMR) belonging to a first serving cell (cell1) used as a reference for intra-frequency operation (e.g., measurements, etc.). The determining may also be based on one or more of: a rule or a signaling/indication from network node. The UE may also operate/be configured with two or more serving cells, e.g. cell1, cell2, cell3. For each serving cell, the UE will obtain a corresponding RMR and determine corresponding intra-frequency cells independently.

According to a second embodiment, based on the determined frequency resources for intra-frequency operation, the UE uses the above information for one or more of: determining whether a neighbor cell (cell2) is an intra- or inter-frequency neighbor cell; differentiation between intra- and inter-frequency operation (e.g., performing differently intra- and inter-frequency operations, performing at least one different step for intra- and inter-frequency operation, operating while meeting intra-frequency and inter-frequency requirements that are different for the same type of operation such as radio measurements); configuring its bandwidth, e.g., measurement bandwidth (BW) or reference bandwidth (RF BW); configuring its transmission (e.g., in time division duplex (TDD) operation or a like the UE transmission bandwidth is not beyond the determined intra-frequency resources); and the like.

In another embodiment, a method for use in a user equipment comprises obtaining a first measurement resource of a first cell as a reference measurement resource. The method additionally comprises obtaining a second measurement resource of a second cell, the second measurement resource of the second cell and the first measurement resource of the first cell are of the same type. The method further comprises determining whether the second cell operates on an intra-frequency carrier or an inter-frequency carrier by comparing the reference measurement resource to the second measurement resource of the second cell.

In another embodiment, the user equipment obtains information about the reference measurement resource based on an indication received from a network node. In yet another embodiment, the user equipment described herein adapts a measurement procedure in response to the determination of whether the second cell operates on the intra-frequency carrier or the inter-frequency carrier.

In yet another embodiment, a method for use in a network node comprises obtaining a first measurement resource of a first cell as a reference measurement resource. The method additionally comprises obtaining a second measurement resource of a second cell, the second measurement resource of the second cell and the first measurement resource of the first cell are of the same type. The method further comprises determining whether the second cell operates on an intra-frequency carrier or an inter-frequency carrier by comparing the reference measurement resource to the second measurement resource of the second cell and transmitting to a user equipment information about the determination of whether the second cell operates on the intra-frequency carrier or the inter-frequency carrier.

In another embodiment, a network node determines the intra-frequency RMR and provides the intra-frequency RMR configuration to another node, e.g., another network node or another UE. In yet another embodiment, the network node transmits information about the obtained RMR to the user equipment.

In certain embodiments, the first and second measurement resources comprise SS block or CSI-RS. In certain embodiments, the network node described herein further comprises adapting a measurement configuration transmitted to the user equipment in response to the determination of whether the second cell operates on the intra-frequency carrier or the inter-frequency carrier.

Particular embodiments are described for a UE and a network node. In one embodiment, the user equipment for determining intra-frequency operations and inter-frequency operations, comprises: at least one processing circuitry; and at least one storage that stores processor-executable instructions, when executed by the processing circuitry, it causes the user equipment to: obtain a first measurement resource of a first cell as a reference measurement resource, obtain a second measurement resource of a second cell, the second measurement resource of the second cell and the first measurement resource of the first cell are of the same type, determine whether the second cell operates on an intra-frequency carrier or an inter-frequency carrier by comparing the reference measurement resource to the second measurement resource of the second cell.

In one embodiment, the network node for determining intra-frequency operations and inter-frequency operations for a user equipment, comprises: at least one processing circuitry; and at least one storage that stores processor-executable instructions, when executed by the processing circuitry, it causes the network node to: obtain a second measurement resource of a second cell, the second measurement resource of the second cell and the first measurement resource of the first cell are of the same type, determine whether the second cell operates on an intra-frequency carrier or an inter-frequency carrier by comparing the reference measurement resource to the second measurement resource of the second cell, and transmit to a user equipment information about the determination of whether the second cell operates on the intra-frequency carrier or the inter-frequency carrier.

In another embodiment, a communication system for determining intra-frequency operation and inter-frequency operations comprises a network node comprising at least one processing circuitry configured to: obtain a first measurement resource of a first cell as a reference measurement resource; obtain a second measurement resource of a second cell, the second measurement resource of the second cell and the first measurement resource of the first cell are of the same type; and transmit to a user equipment the reference measurement resource and the second measurement resource of the second cell; and a user equipment within a network comprising at least one processing circuitry configured to: receive the reference measurement resource and the second measurement resource of the second cell from the network node; and determine whether the second cell operates on an intra-frequency carrier or an inter-frequency carrier by comparing the reference measurement resource to the second measurement resource of the second cell.

Certain aspects of the present disclosure and their embodiments may provide solutions to these or other challenges. There are, proposed herein, various embodiments which address one or more of the issues disclosed herein.

Certain embodiments may provide one or more of the following technical advantages. The method disclosed in the present disclosure may provide a possibility to differentiate between intra- and inter-frequency operations in NR. The method may further define UE behavior, which is known to the network, so that the network can control UE performance because intra- and inter-frequency operations have typically quite different performance.

Various other features and advantages will become obvious to one of ordinary skill in the art in light of the following detailed description and drawings. Certain embodiments may have none, some, or all of the recited advantages.

BRIEF DESCRIPTION OF THE DRAWINGS

The accompanying drawing figures incorporated in and forming a part of this specification illustrate several aspects of the disclosure, and together with the description serve to explain the principles of the disclosure.

DESCRIPTION OF EMBODIMENTS

Figure 1:
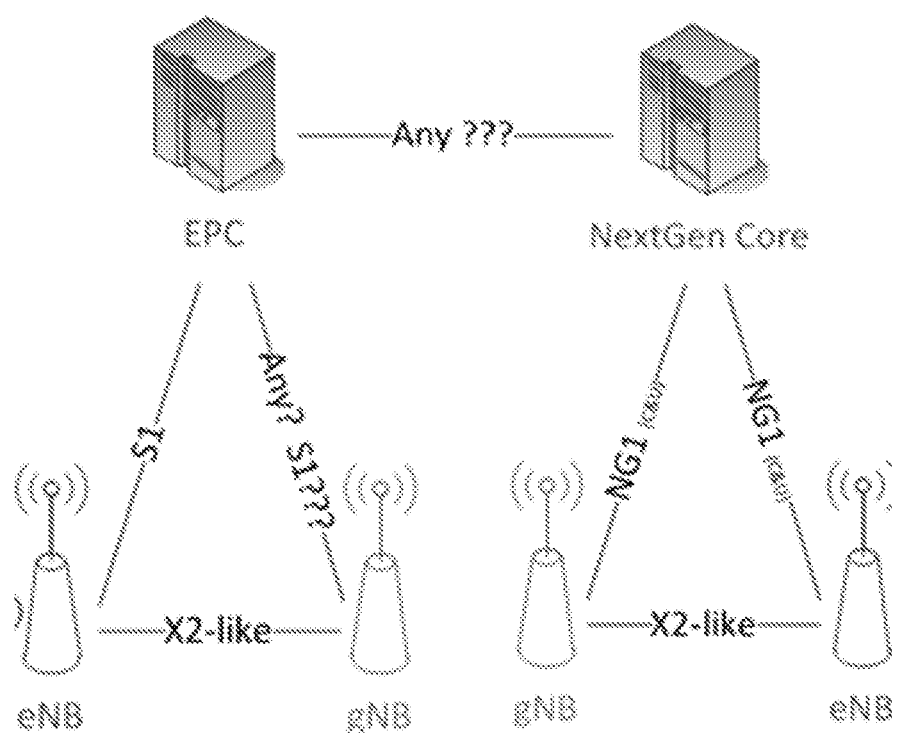
FIG. 1 illustrates an example new radio architecture in 3rd Generation Partnership Project.
Figure 2:
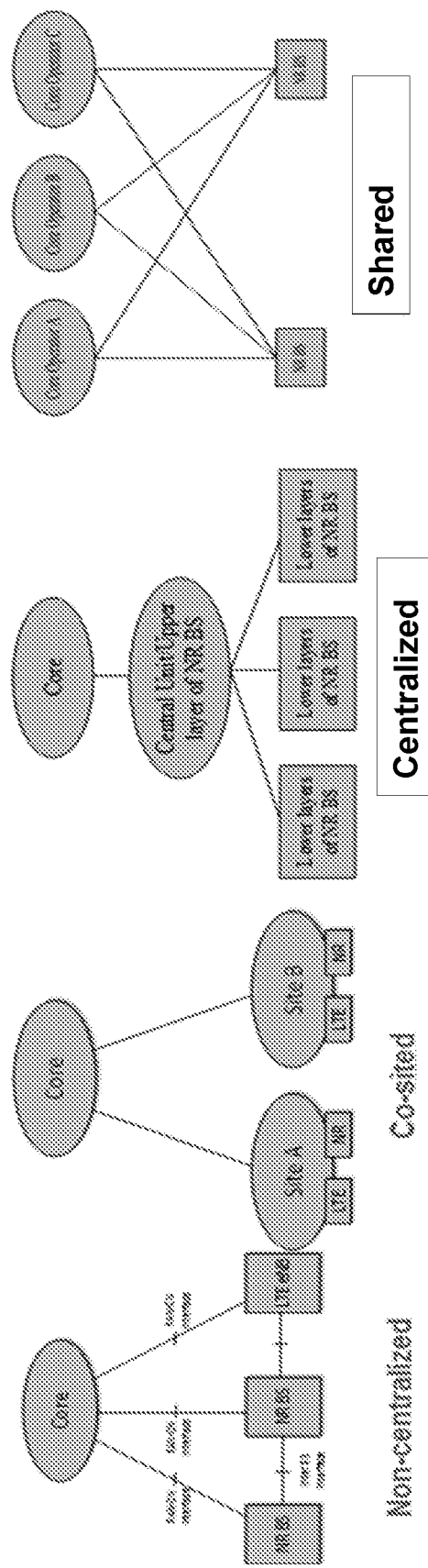
FIG. 2 illustrates exemplary deployment scenarios with new radio base stations in 3GPP.
Figure 3:
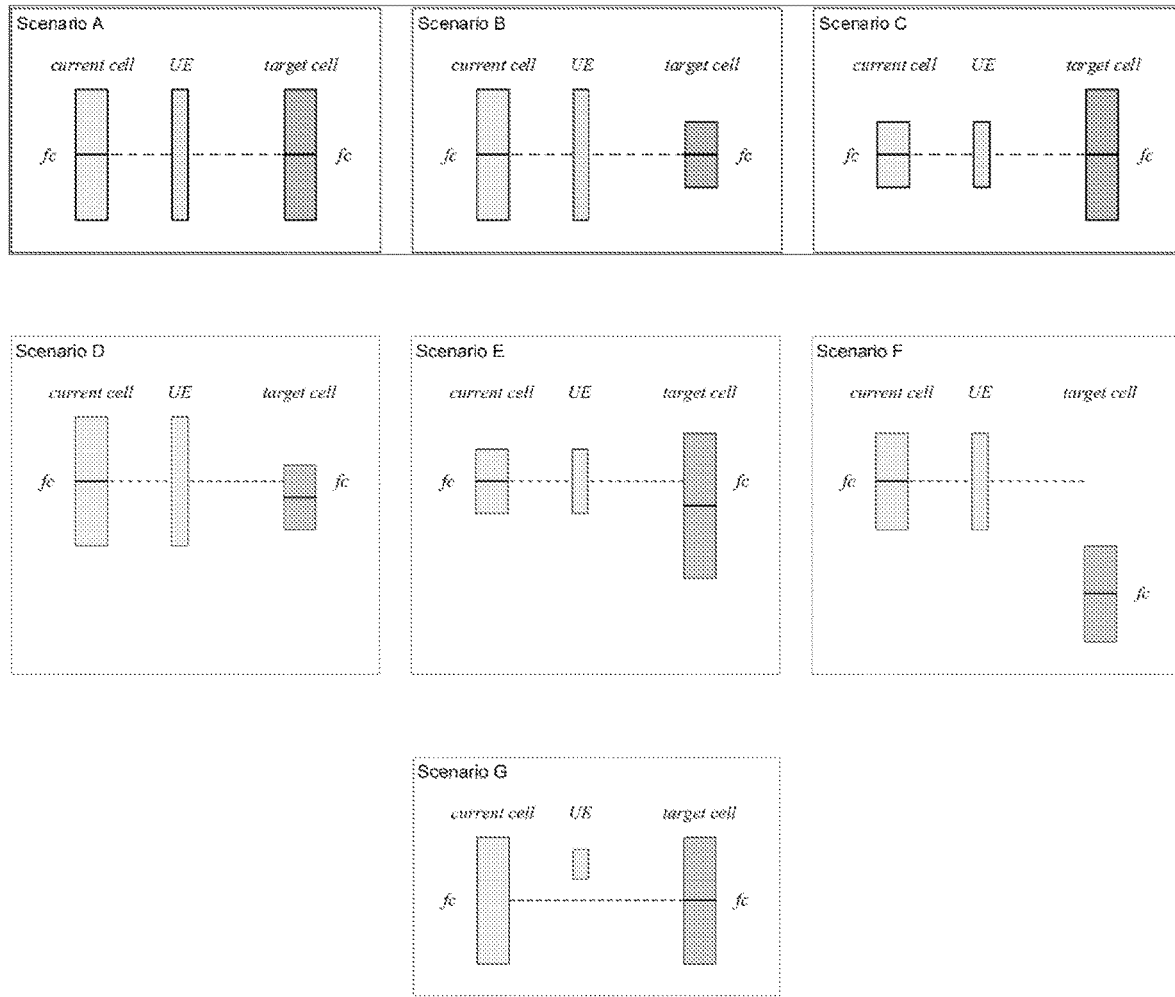
FIG. 3 illustrates multiple measurement scenarios of intra-frequency and inter-frequency UE operations.

In a typical LTE system, the current cell and target cell can operate on the same frequency (intra-frequency scenario), and/or on different frequencies (inter-frequency scenario). Selecting between intra-frequency operations and inter-frequency becomes critical, because interference may occur when the target cell is adjacent to the current cell and operates on the intra-frequency carrier, and it is not desirable to perform inter-frequency operations for every handover due to insufficient bandwidth. A UE requires to perform a reconfiguration after receiving a measurement indicating that the target cell operates on the inter-frequency carrier. This sometimes leads to a latency or a handover failure.

Furthermore, in a NR system with larger bandwidths, synchronization signals and SS blocks are not necessarily centered within a system bandwidth. Multiple SS blocks may be configured by the network within a carrier bandwidth, in the same or different time resources (e.g., subframes). Therefore, the method in the present disclosure for differentiating between intra- and inter-frequency operations for UE in NR provides a solution to the aforementioned problems. The method in the present disclosure determines whether the target cell operates on an intra- or inter-frequency carrier based on a comparison of a reference measurement resource and the target measurement resource, and differentiates between intra- and inter-frequency operations.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also, in some embodiments, generic terminology "network node" is used. It can be any kind of network node which may comprise of a radio network node such as base station, radio base station, base transceiver station, base station controller, network controller, multi-standard radio BS, gNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., MME, SON node, a coordinating node, positioning node, MDT node, etc.), or even an external node (e.g., 3rd party node, a node external to the current network), etc. The network node may also comprise a test equipment.

The term "radio node" used herein may be used to denote a UE or a radio network node.

The term "signaling" used herein may comprise any of: high-layer signaling (e.g., via radio resource control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "radio measurement" used herein may refer to any measurement performed on radio signals. Radio measurements can be absolute or relative. Radio measurement may be called as signal level which may be signal quality and/or signal strength. Radio measurements can be e.g. intra-frequency, inter-frequency, inter-RAT measurements, CA measurements, etc. Radio measurements can be unidirectional (e.g., DL or UL) or bidirectional (e.g., RTT, Rx-Tx, etc.). Some examples of radio measurements: timing measurements (e.g., TOA, timing advance, RTT, RSTD, Rx-Tx, propagation delay, etc.), angle measurements (e.g., angle of arrival), power-based measurements (e.g., received signal power, RSRP, received signal quality, RSRQ, SINR, SNR, interference power, total interference plus noise, RSSI, noise power, etc.), cell detection or cell identification, radio link monitoring (RLM), system information (SI) reading, etc.

The inter-frequency and inter-RAT measurements are carried out by the UE in measurement gaps unless the UE is capable of doing such measurement without gaps. Examples of measurement gaps are measurement gap id #0 (each gap of 6 ms occurring every 40 ms), measurement gap id #1 (each gap of 6 ms occurring every 80 ms), etc. The measurement gaps are configured at the UE by the network node.

Performing a measurement on a carrier may imply performing measurements on signals of one or more cells operating on that carrier or performing measurements on signals of the carrier (aka carrier specific measurement e.g. RSSI). Examples of cell specific measurements are signal strength, signal quality etc.

The term measurement performance used herein may refer to any criteria or metric which characterizes the performance of the measurement performed by a radio node. The term measurement performance is also called as measurement requirement, measurement performance requirements etc. The radio node has to meet one or more measurement performance criteria related to the performed measurement. Examples of measurement performance criteria are measurement time, number of cells to be measured with the measurement time, measurement reporting delay, measurement accuracy, measurement accuracy with reference to a reference value (e.g. ideal measurement result) etc. Examples of measurement time are measurement period, cell identification period, evaluation period, etc.

The term numerology here may comprise any one or a combination of: subcarrier spacing, number of subcarriers within a bandwidth, resource block size, symbol length, CP length, etc. In one specific non-limiting example, numerology comprises subcarrier spacing of 7.5 kHz, 15 kHz, 30 kHz, 60 kHz, 120 kHz, or 240 kHz. In another example, numerology is the CP length which may be used with subcarrier spacing 30 kHz or larger.

The term bandwidth (BW) used herein is range of frequencies over which a node transmits to and/or receives signal from another node. The BW is interchangeably called as operating bandwidth, channel bandwidth, system bandwidth, configured bandwidth, transmission bandwidth, cell bandwidth, cell transmission BW, carrier bandwidth etc. The BW can be expressed in any one of the following: G1 MHz, G2 GHz, in in terms of number of physical channels (e.g. G3 resource blocks, G4 subcarriers etc.). In one example the BW can include guard band while in another example the BW can exclude guard band. For example, system or channel BW can include guard band while transmission bandwidth consists of BW without guard band. For simplicity term BW is used in the embodiments.

The embodiments described herein are applicable to any multicarrier system wherein at least two radio network nodes can configure radio measurements for the same UE. One specific example scenario comprises a dual connectivity deployment with LTE PCell and NR PSCell. Another example scenario is a dual connectivity deployment with NR PCell and NR PSCell.

Figure 4:
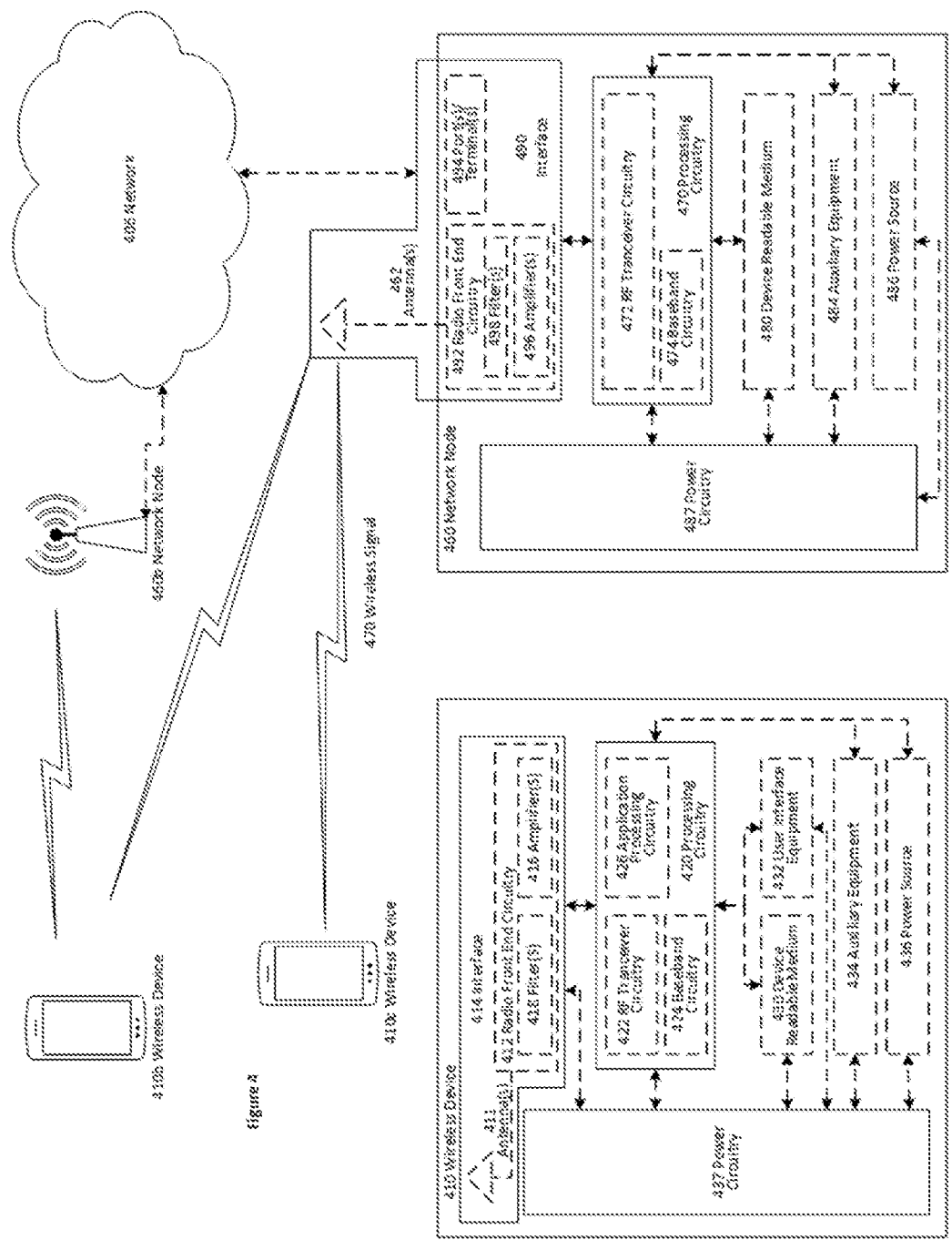
FIG. 4 illustrates an example wireless network, according to certain embodiments.

FIG. 4 is an example wireless network, according to certain embodiments in accordance with certain embodiments. Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 406, network nodes 460 and 460b, and wireless devices (WDs) 410, 410b, and 410c. In practice, a wireless network may further include any additional elements suitable to support communication between wireless devices or between a wireless device and another communication device, such as a landline telephone, a service provider, or any other network node or end device. Of the illustrated components, network node 460 and wireless device (WD) 410 are depicted with additional detail. In certain embodiments, the network node 460 may be a network node which is further depicted in FIGS. 16 and 18. In some embodiments, the network node 460 may be a base station which is further depicted in FIGS. 7 to 12. In certain embodiments, the wireless device 410 may be a user equipment, which is further illustrated in FIGS. 5, 7-12, and 14-16. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and WD 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 460 includes processing circuitry 470, device readable medium 480, interface 490, auxiliary equipment 484, power source 486, power circuitry 487, and antenna 462. Although network node 460 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). In some embodiments, network node 460 may carry out functionalities of the wireless device 410, such as a determination of intra- and inter-frequency operations described with respect to FIG. 15. Network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination. In particular embodiments, the processing circuitry 470 of the network node 460 may perform the methods, which are further illustrated in FIGS. 15 and 16.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. The benefits provided by such functionality are not limited to processing circuitry 470 alone or to other components of network node 460, but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signaling and/or data between network node 460, network 406, and/or WDs 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470. Radio front end circuitry 492 may receive digital data that is to be sent out to other network nodes or WDs via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 490 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487. The battery may provide backup power should the external power source fail. Other types of power sources, such as photovoltaic devices, may also be used.

Alternative embodiments of network node 460 may include additional components beyond those shown in FIG. 4 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). In certain embodiments, the wireless device 410 may be a user equipment which is further depicted in FIGS. 13-15 and 17. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 and power circuitry 437. WD 410 may include multiple sets of one or more of the illustrated components for different wireless technologies supported by WD 410, such as, for example, GSM, WCDMA, LTE, NR, WiFi, WiMAX, or Bluetooth wireless technologies, just to mention a few. These wireless technologies may be integrated into the same or different chips or set of chips as other components within WD 410.

Antenna 411 may include one or more antennas or antenna arrays, configured to send and/or receive wireless signals, and is connected to interface 414. In certain alternative embodiments, antenna 411 may be separate from WD 410 and be connectable to WD 410 through an interface or port. Antenna 411, interface 414, and/or processing circuitry 420 may be configured to perform any receiving or transmitting operations described herein as being performed by a WD. Any information, data and/or signals may be received from a network node and/or another WD. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 414 is connected to antenna 411 and processing circuitry 420, and is configured to condition signals communicated between antenna 411 and processing circuitry 420. Radio front end circuitry 412 may be coupled to or a part of antenna 411. In some embodiments, WD 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or WDs via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 410 components, such as device readable medium 430, WD 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein. In particular embodiments, the processing circuitry 420 of the wireless device 410 may perform the method which is further illustrated in FIG. 15.

As illustrated, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of WD 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionalities described herein as being performed by a WD may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hard-wired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of WD 410, but are enjoyed by WD 410 as a whole, and/or by end users and the wireless network generally.

Processing circuitry 420 may be configured to perform any determining, calculating, or similar operations (e.g., certain obtaining operations) described herein as being performed by a WD. These operations, as performed by processing circuitry 420, may include processing information obtained by processing circuitry 420 by, for example, converting the obtained information into other information, comparing the obtained information or converted information to information stored by WD 410, and/or performing one or more operations based on the obtained information or converted information, and as a result of said processing making a determination.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with WD 410. Such interaction may be of many forms, such as visual, audial, tactile, etc. User interface equipment 432 may be operable to produce output to the user and to allow the user to provide input to WD 410. The type of interaction may vary depending on the type of user interface equipment 432 installed in WD 410. For example, if WD 410 is a smart phone, the interaction may be via a touch screen; if WD 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into WD 410, and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from WD 410, and to allow processing circuitry 420 to output information from WD 410. User interface equipment 432 may include, for example, a speaker, a display, vibrating circuitry, a USB port, a headphone interface, or other output circuitry. Using one or more input and output interfaces, devices, and circuits, of user interface equipment 432, WD 410 may communicate with end users and/or the wireless network, and allow them to benefit from the functionality described herein.

Auxiliary equipment 434 is operable to provide more specific functionality which may not be generally performed by WDs. This may comprise specialized sensors for doing measurements for various purposes, interfaces for additional types of communication such as wired communications etc.

The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. WD 410 may further comprise power circuitry 437 for delivering power from power source 436 to the various parts of WD 410 which need power from power source 436 to carry out any functionality described or indicated herein. Power circuitry 437 may in certain embodiments comprise power management circuitry. Power circuitry 437 may additionally or alternatively be operable to receive power from an external power source; in which case WD 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of WD 410 to which power is supplied.

Figure 5:
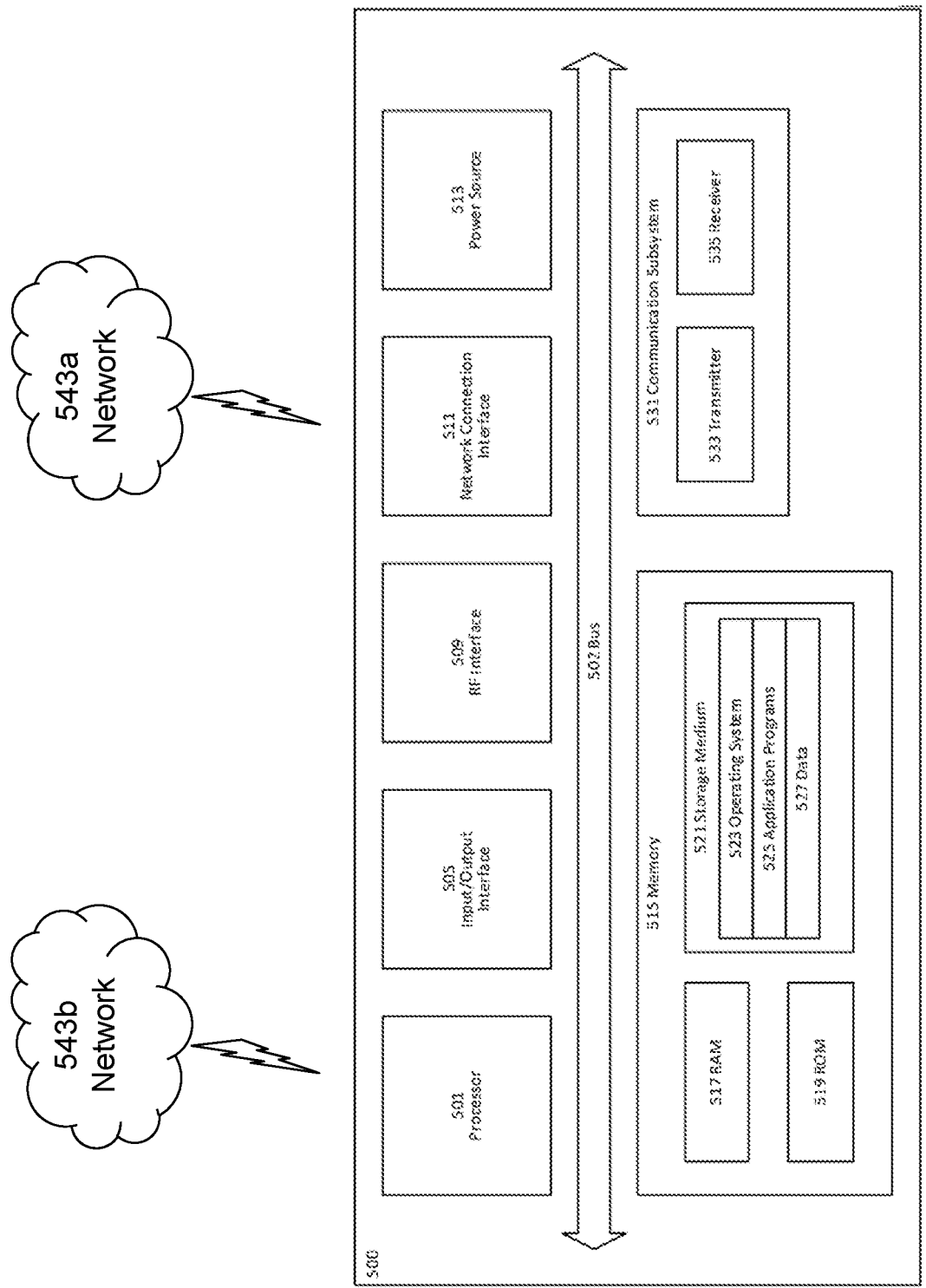
FIG. 5 illustrates an example user equipment, according to certain embodiments.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 500 may be any UE identified by the 3rd Generation Partnership Project (3GPP), including a NB-IoT UE, a machine type communication (MTC) UE, and/or an enhanced MTC (eMTC) UE. UE 500, as illustrated in FIG. 5, is one example of a WD configured for communication in accordance with one or more communication standards promulgated by the 3rd Generation Partnership Project (3GPP), such as 3GPP's GSM, UMTS, LTE, and/or 5G standards. In certain embodiments, the user equipment 500 may be a user equipment which is further depicted in FIGS. 13-15 and 17. As mentioned previously, the term WD and UE may be used interchangeable. Accordingly, although FIG. 5 is a UE, the components discussed herein are equally applicable to a WD, and vice-versa.

In FIG. 5, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 509 may be configured to provide a communication interface to RF components such as a transmitter, a receiver, and an antenna. Network connection interface 511 may be configured to provide a communication interface to network 543a. Network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 5, processing circuitry 501 may be configured to communicate with network 543b using communication subsystem 531. Network 543a and network 543b may be the same network or networks or different network or networks. Communication subsystem 531 may be configured to include one or more transceivers used to communicate with network 543b. For example, communication subsystem 531 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543b may encompass wired and/or wireless networks such as a local-area network (LAN), a wide-area network (WAN), a computer network, a wireless network, a telecommunications network, another like network or any combination thereof. For example, network 543b may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 6:
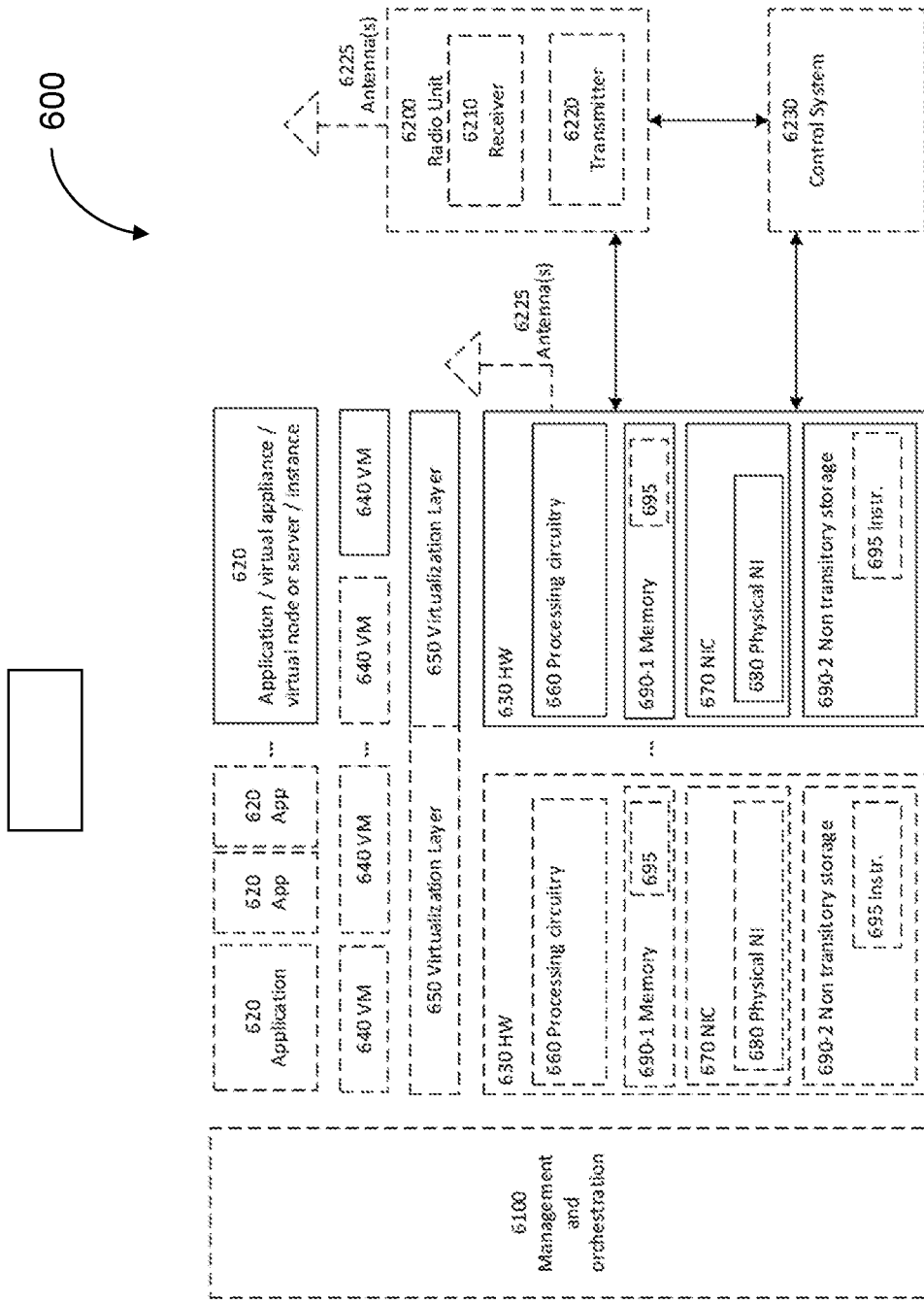
FIG. 6 illustrates an example virtualization environment, according to certain embodiments.

FIG. 6 illustrates an example virtualization environment, according to certain embodiments. FIG. 6 is a schematic block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware nodes 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640.

As shown in FIG. 6, hardware 630 may be a standalone network node with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network elements (VNE).

Still in the context of NFV, Virtual Network Function (VNF) is responsible for handling specific network functions that run in one or more virtual machines 640 on top of hardware networking infrastructure 630 and corresponds to application 620 in FIG. 6.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

In some embodiments, some signaling can be affected with the use of control system 6230 which may alternatively be used for communication between the hardware nodes 630 and radio units 6200.

Figure 7:
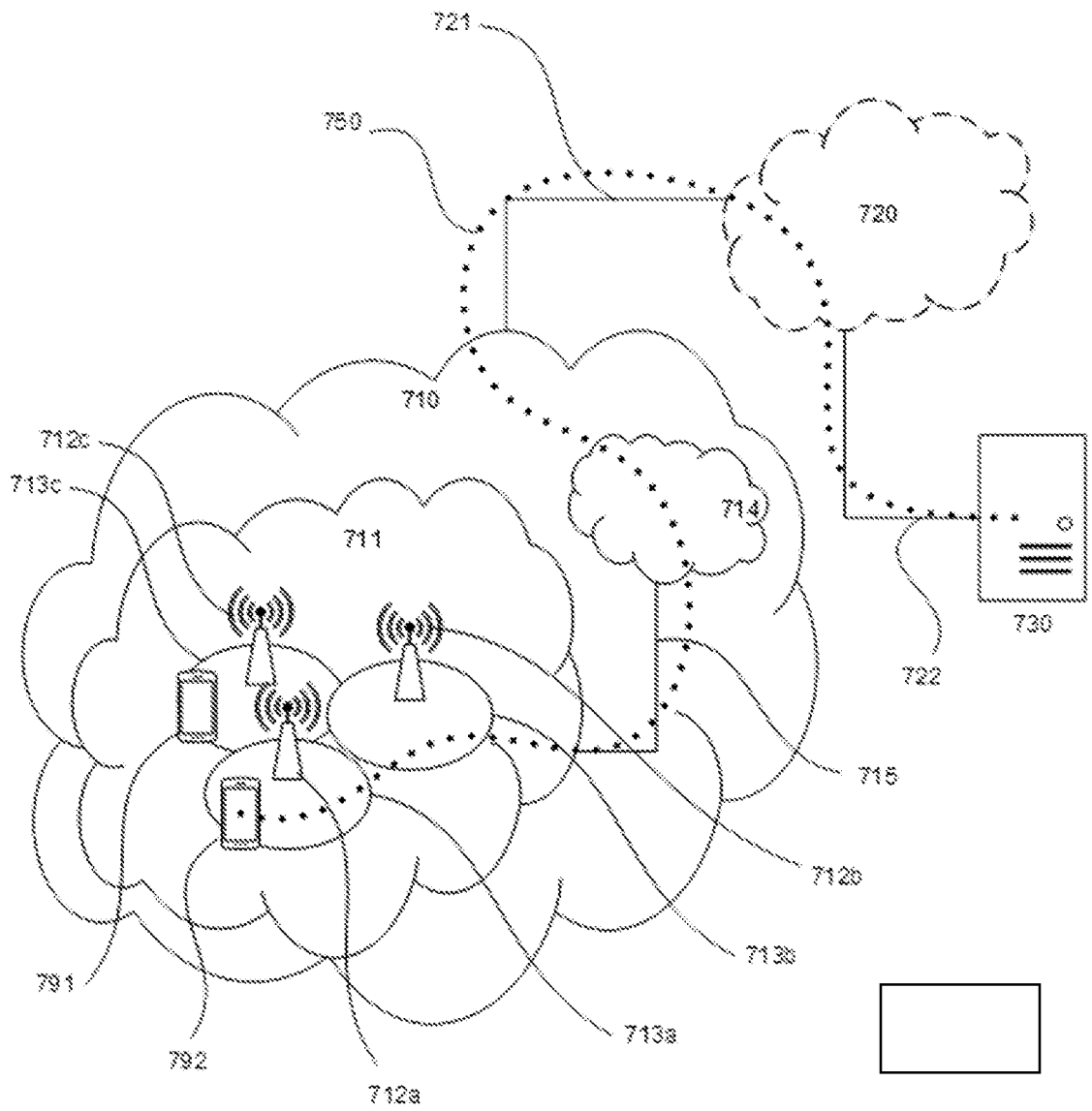
FIG. 7 illustrates an example telecommunication network connected via an intermediate network to a host computer, according to certain embodiments.

FIG. 7 illustrates an example telecommunication network connected via an intermediate network to a host computer, according to certain embodiments. With reference to FIG. 7, in accordance with an embodiment, a communication system includes telecommunication network 710, such as a 3GPP-type cellular network, which comprises access network 711, such as a radio access network, and core network 714. Access network 711 comprises a plurality of base stations 712a, 712b, 712c, such as NBs, eNBs, gNBs or other types of wireless access points, each defining a corresponding coverage area 713a, 713b, 713c. In certain embodiments, the plurality of base stations 712a, 712b, 712c may be the network node as described with respect to FIGS. 16 and 18. In certain embodiments, the plurality of base stations 712a, 712b, 712c may perform the functionality of the user equipment as described with respect to FIGS. 13-15 and 17. Each base station 712a, 712b, 712c is connectable to core network 714 over a wired or wireless connection 715. A first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712. In certain embodiments, the plurality of UEs 791, 792 may be the user equipment as described with respect to FIGS. 13-15 and 17.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider, or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more subnetworks (not shown).

The communication system of FIG. 7 as a whole enables connectivity between the connected UEs 791, 792 and host computer 730. The connectivity may be described as an over-the-top (OTT) connection 750. Host computer 730 and the connected UEs 791, 792 are configured to communicate data and/or signaling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

Figure 8:
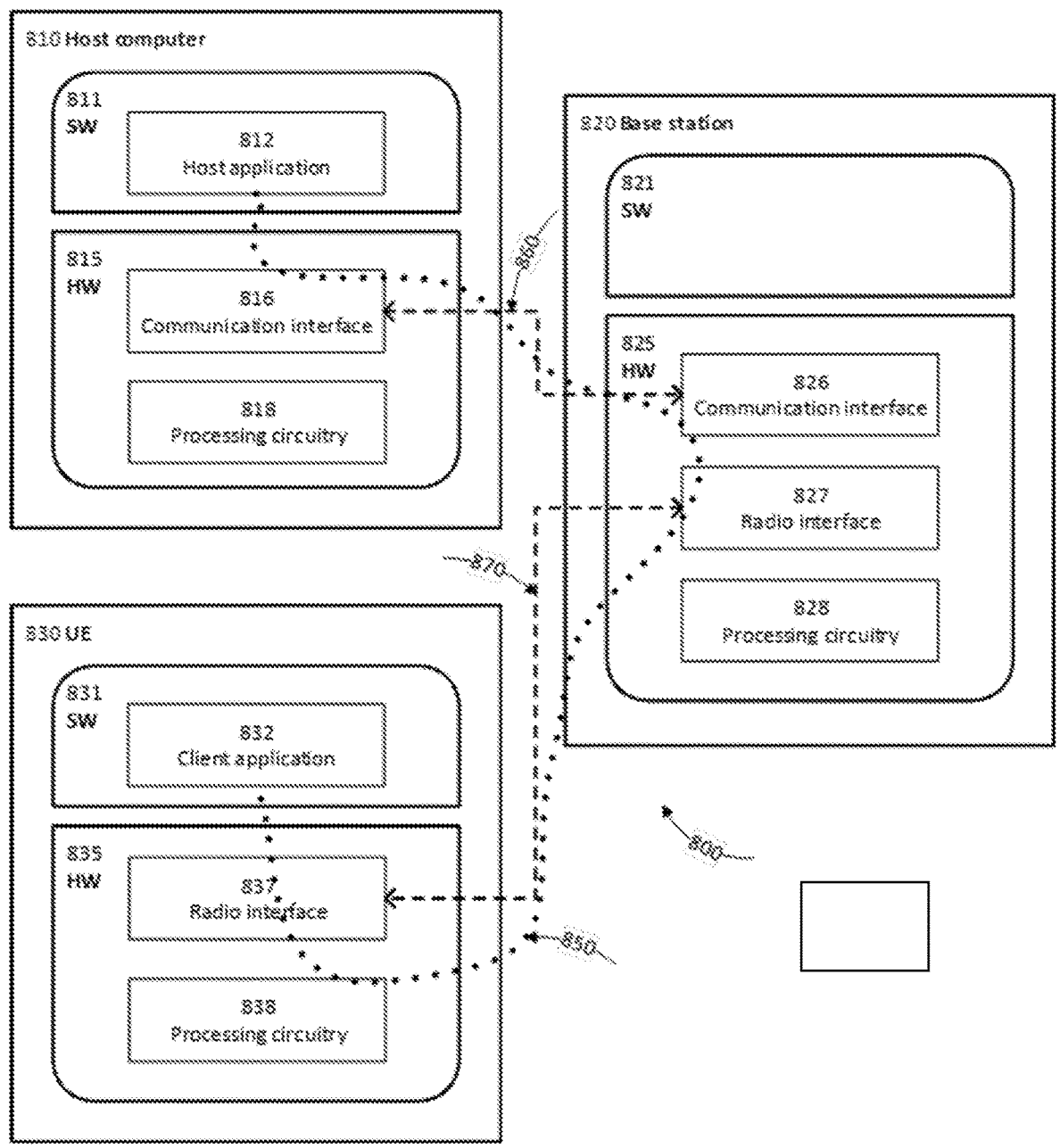
FIG. 8 illustrates an example host computer communicating via a base station with a user equipment over a partially wireless connection, according to certain embodiments.

FIG. 8 illustrates an example host computer communicating via a base station with a user equipment over a partially wireless connection, in accordance with some embodiments. Example implementations, in accordance with an embodiment, of the UE, base station and host computer discussed in the preceding paragraphs will now be described with reference to FIG. 8. In communication system 800, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. In providing the service to the remote user, host application 812 may provide user data which is transmitted using OTT connection 850.

Communication system 800 further includes base station 820 provided in a telecommunication system and comprising hardware 825 enabling it to communicate with host computer 810 and with UE 830. In certain embodiments, the base station 820 may be the network node as described with respect to FIGS. 16 and 18. Hardware 825 may include communication interface 826 for setting up and maintaining a wired or wireless connection with an interface of a different communication device of communication system 800, as well as radio interface 827 for setting up and maintaining at least wireless connection 870 with UE 830 located in a coverage area (not shown in FIG. 8) served by base station 820. Communication interface 826 may be configured to facilitate connection 860 to host computer 810. Connection 860 may be direct or it may pass through a core network (not shown in FIG. 8) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. In certain embodiments, the UE 830 may be the user equipment as described with respect to FIGS. 13-15 and 17. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions.

UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

It is noted that host computer 810, base station 820 and UE 830 illustrated in FIG. 8 may be similar or identical to host computer 730, one of base stations 712*a*, 712*b*, 712*c* and one of UEs 791, 792 of FIG. 7, respectively. This is to say, the inner workings of these entities may be as shown in FIG. 8 and independently, the surrounding network topology may be that of FIG. 7.

In FIG. 8, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment. More precisely, the teachings of these embodiments may improve the handling of redundant data in the transmit buffer and thereby provide benefits such as improved efficiency in radio resource use (e.g., not transmitting redundant data) as well as reduced delay in receiving new data (e.g., by removing redundant data in the buffer, new data can be transmitted sooner).

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above, or supplying values of other physical quantities from which software 811, 831 may compute or estimate the monitored quantities. The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art. In certain embodiments, measurements may involve proprietary UE signaling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

Figure 9:
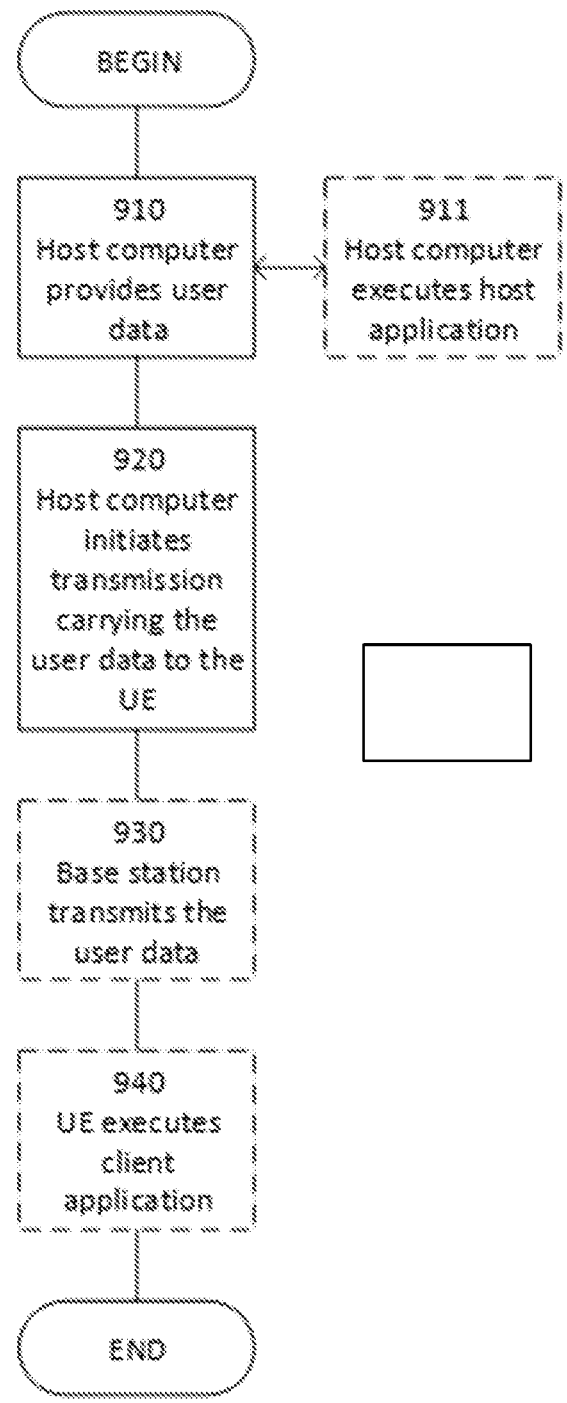
FIG. 9 illustrates an example method implemented in a communication system including a host computer, a base station and a user equipment, according to certain embodiments.

FIG. 9 illustrates an example method implemented in a communication system including a host computer, a base station and a user equipment, according to certain embodiments in accordance with some embodiments. More specifically, FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
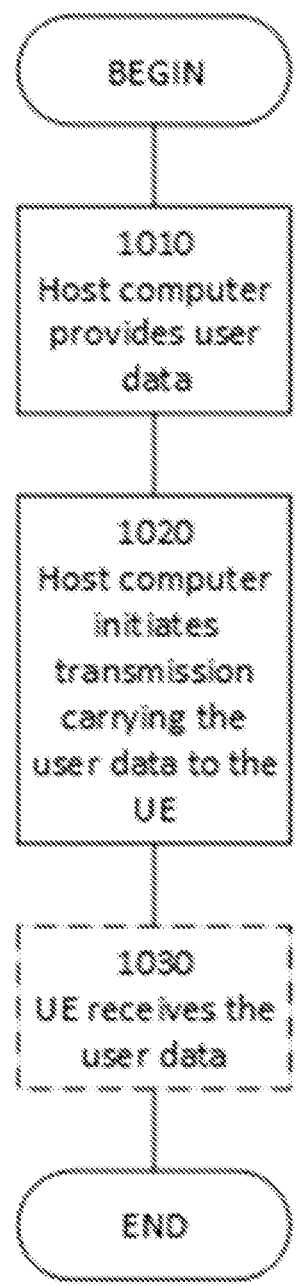
FIG. 10 illustrates another example method implemented in a communication system including a host computer, a base station and a user equipment, according to certain embodiments.

FIG. 10 illustrates an example method implemented in a communication system including a host computer, a base station and a user equipment, in accordance with some embodiments. More specifically, FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
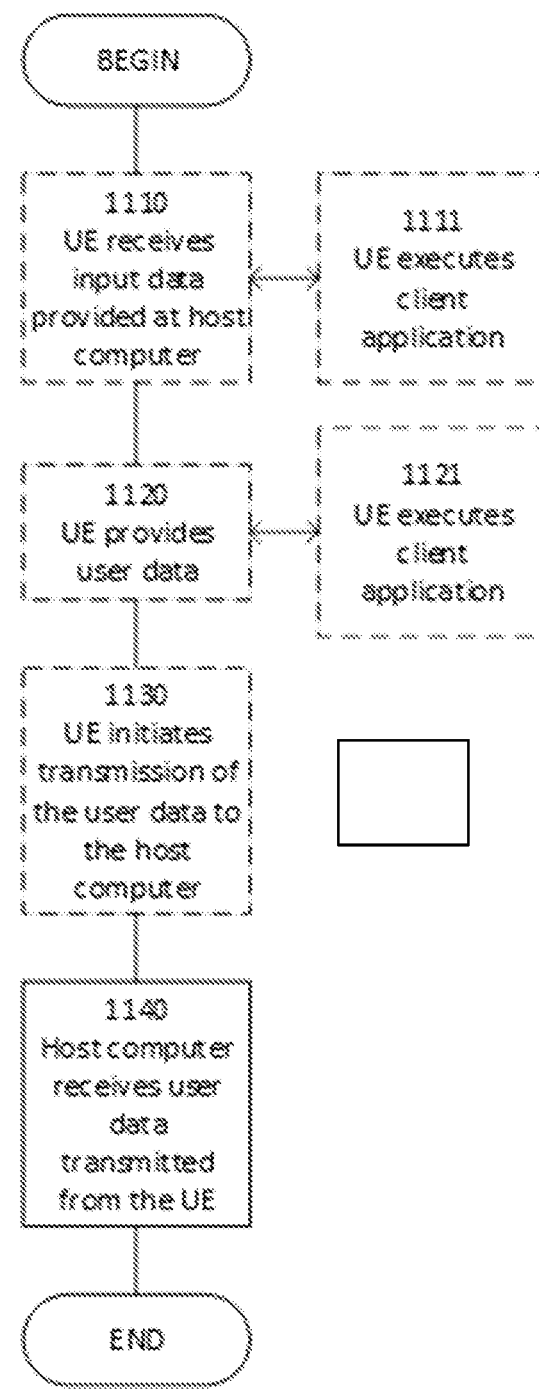
FIG. 11 illustrates another further example method implemented in a communication system including a host computer, a base station and a user equipment, according to certain embodiments.

FIG. 11 illustrates another further example method implemented in a communication system including a host computer, a base station and a user equipment, in accordance with some embodiments. More specifically, FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
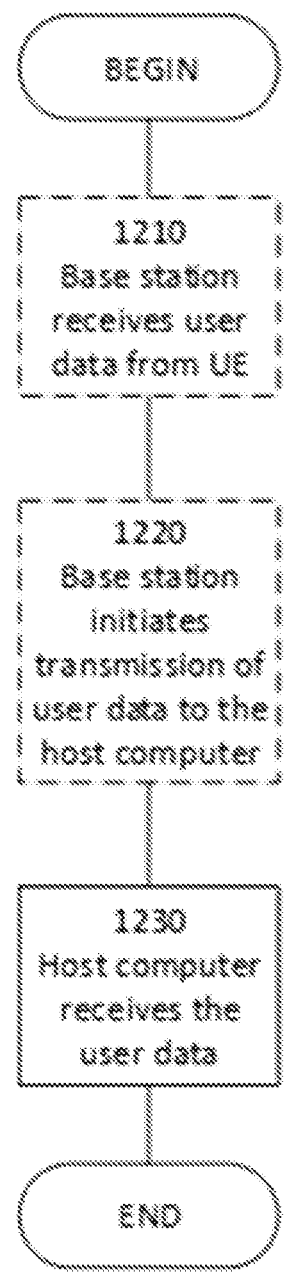
FIG. 12 illustrates another yet example method implemented in a communication system including a host computer, a base station and a user equipment, according to certain embodiments.

FIG. 12 illustrates another example method implemented in a communication system including a host computer, a base station and a user equipment, in accordance with some embodiments. More specifically, FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 13:
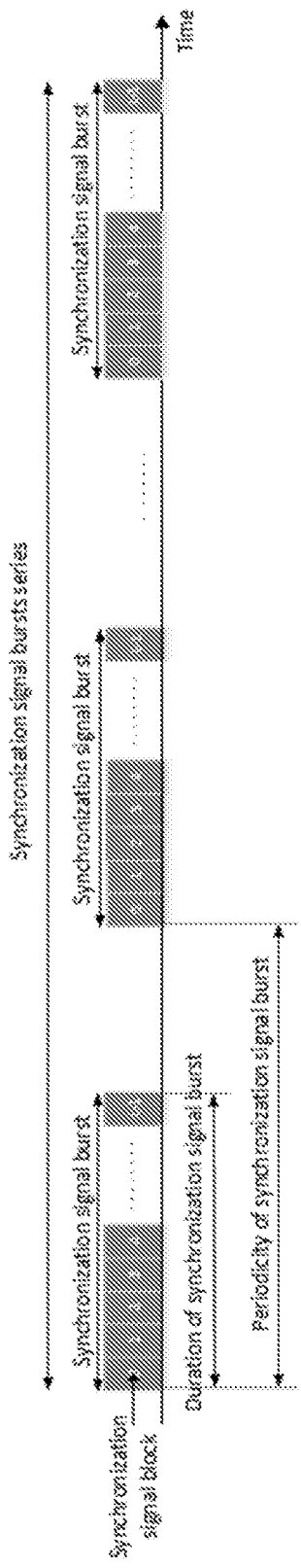
FIG. 13 illustrates an example configuration of synchronization signal (SS) blocks, SS bursts and SS burst sets, in accordance with certain embodiments.

FIG. 13 illustrates an example configuration of synchronization signal (SS) blocks, SS bursts and SS burst sets in cells, in accordance with certain embodiments. FIG. 13 describes a non-limiting example of SS block and SS burst configuration carried out by the user equipment which may be assumed in other embodiments. In some embodiments, the user equipment may be the user equipment as described with respect to FIGS. 15 and 17. The signals comprised in SS block may be used for measurements on NR carrier, including intra-frequency, inter-frequency and inter-RAT (i.e., NR measurements from another RAT).

Regarding SS block, NR-primary synchronization signals (PSS), NR-secondary synchronization signals (SSS) and/or NR-Physical Broadcast Channel (PBCH) can be transmitted within a SS block. For a given frequency band, an SS block corresponds to N OFDM symbols based on the default subcarrier spacing, and N is a constant. A UE shall be able to identify at least OFDM symbol index, slot index in a radio frame and radio frame number from an SS block. A single set of possible SS block time locations (e.g., with respect to radio frame or with respect to SS burst set) is specified per frequency band. At least for multi-beams case, at least the time index of SS-block is indicated to the UE. The position(s) of actual transmitted SS-blocks can be informed for helping CONNECTED/IDLE mode measurement, for helping a CONNECTED mode UE to receive DL data/control in unused SS-blocks and potentially for helping an IDLE mode UE to receive DL data/control in unused SS-blocks.

Regarding SS burst, one or multiple SS blocks compose an SS burst. The maximum number of SS-blocks, L, within SS burst set may or may not be carrier frequency dependent. The maximum number of SS-blocks within SS burst set, L, for different frequency ranges is various. For example, when the frequency range is up to 3 GHz, L is 4. When the frequency range is from 3 GHz to 6 GHz, L is 8. When the frequency range is from 6 GHz to 52.6 GHz, L is 64.

Regarding SS burst set, one or multiple SS bursts further compose an SS burst set (or series) where the number of SS bursts within a SS burst set is finite. From a physical layer specification perspective, at least one periodicity of SS burst set is supported. From a UE perspective, SS burst set transmission is periodic. At least for an initial cell selection, a UE may assume a default periodicity of SS burst set transmission for a given carrier frequency (e.g., one of 5 ms, 10 ms, 20 ms, 40 ms, 80 ms, or 160 ms). The UE may assume that a given SS block is repeated with a SS burst set periodicity. By default, the UE may neither assume the gNB transmits the same number of physical beam(s), nor the same physical beam(s) across different SS-blocks within an SS burst set. In a special case, an SS burst set may comprise one SS burst.

For each carrier, the SS blocks may be time-aligned or overlap fully or at least in part, or the beginning of the SS blocks may be time-aligned, even the actual number of transmitted SS blocks is different in different cells.

Regarding the methods performed in UE and network node for determining intra- or inter-frequency operations, a UE determines one or a set of reference or anchor radio measurement resources (RMR) belonging to a first serving cell (cell1) used as a reference for intra-frequency operations. The UE may also operate/be configured with two or more serving cells e.g. cell1, cell2, cell3. For each serving cell, the UE will obtain a corresponding RMR and determine corresponding intra-frequency cells independently. The UE may be in any RRC states, e.g., IDLE, INACTIVE, or CONNECTED state.

The intra-frequency RMR or intra-frequency RMR configuration may be characterized by a bandwidth, number of reference blocks (RBs) comprising a certain set of RBs, center of the RMR, start/end of RMR in frequency, offset from a reference in frequency domain (e.g., delta RBs from DC or from a specific RB), etc.

The intra-frequency RMR may be determined for a specific limited time period, e.g., comprising one or more subframes, one or more radio frames, etc. In a further embodiment, the intra-frequency RMR may not be changed more frequently than a certain time T1change. Also, the determining may be done at least as frequent as T2determine.

The intra-frequency RMR may also be associated with specific periodic or aperiodic time-domain resources or time domain pattern, e.g., UE activity pattern, DRX pattern, measurement time-domain pattern, gap pattern, etc. For example, intra-frequency RMR applies in the resources (e.g., one or more subframes or radio frames or slots, etc.) indicated by the pattern and may not apply in other time-domain resources.

Each of the intra-frequency RMR, inter-frequency RMR, or non-intra-frequency RMR may also comprise one or more so-called bandwidth parts. For example, different bandwidth parts may also be aggregated similar to carrier aggregation.

In yet a further embodiment, the determination may be done periodically or aperiodically. For example, the determination may be done upon a triggering event, condition or an indication/message received from another node.

The intra-frequency RMR may be common in a cell for all UEs or may be specific to one or a group of UEs. The intra-frequency RMR may be statically configured or may be changed dynamically or semi-statically (less frequently).

After the determination, the methods further differentiate the intra- and inter-frequency operations. Examples of intra-frequency operation include but are not limited to RLM, intra-frequency operation in neighbor cell(s), intra-frequency measurements, intra-frequency system information reading, intra-frequency CGI reading, intra-frequency cell detection or cell identification, beam identification, Channel State Information-Reference Signals (CSI-RS) based measurement, CSI-RS group-based measurement, and the like.

In a further embodiment, the intra-frequency RMR may be determined explicitly or implicitly. The implicit determining may be e.g. from the configuration parameters of signals or groups/blocks of signals configured to be used for intra-frequency operation for one or more UEs. The parameter includes but is not limited to frequency resources, bandwidth, resource blocks, part of the carrier, etc. For example, signals to be used for RLM, one or more SS blocks to be used for intra-frequency cell detection or cell identification, CSI-RS or CSI-RS group, one SS block or SS burst or SS burst set (a.k.a. reference SS block, reference SS burst, or reference SS burst set) selected out of multiple SS blocks, SS bursts, or SS burst sets which may be located at different frequency resources within a system bandwidth.

In yet further embodiments, the intra-frequency RMR may be associated specifically with one, some, or all beams associated with the same cell. For example, a subset of beams in a cell are operated based on intra-frequency rules, while at least one other beam in the same cell is operated based on inter-frequency rules.

In some embodiments, intra-frequency operation is performed without measurement gaps. Therefore, in some embodiments intra-frequency operation also be interchangeably be called as, "an operation which does not require measurement gaps", "operation performed without measurement gaps", "non-gap assisted operation", "non-gap assisted measurement" and the like. For example, if the UE can measure on signals of a cell without gaps may be considered as intra-frequency operation.

In some embodiments, intra-frequency operation is performed in measurement gaps. Therefore, in some embodiments intra-frequency operation may also be interchangeably called as, "an operation which requires measurement gaps", "operation performed in measurement gaps", "gap assisted operation", "gap assisted measurement" and the like.

In some embodiments, the term of inter-frequency operation may also interchangeably be called as, "an operation which requires measurement gaps", "operation performed in measurement gaps", "gap assisted operation", "gap assisted measurement" and the like.

The determination of the intra-frequency RMR may be based on one or any combination of a pre-defined location in frequency, which may or may not be different from the resources comprising a DC carrier, one or more intra-frequency rules and inter-frequency rules, and a signaling/indication from another node.

Examples of the intra-frequency rules and inter-frequency rules include but are not limited to intra-frequency RMR being the resources associated with the paging resources in general for a UE or a specific subset of paging resources for the UE, wherein the association can be signaled or pre-defined and paging may be IDLE mode paging, INACTIVE mode paging, or CONNECTED mode paging; intra-frequency RMR being an SS block, SS burst, or SS burst set associated with paging resources, SS block, SS burst, or SS burst set closest to paging resources in frequency domain, wherein paging may be IDLE mode paging, INACTIVE mode paging, or CONNECTED mode paging; intra-frequency RMR being the resources configured for RLM; intra-frequency RMR being the resources within the configured intra-frequency measurement bandwidth; intra-frequency RMR being the resources comprising a control channel e.g. resources in which the UE receives a control channel, wherein the control channel may be physical downlink control channel (PDCCH), E-PDCCH, etc.; intra-frequency RMR being the resources comprising a search space in frequency domain, wherein the UE is expected to receive certain message or channel, e.g. downlink control information; intra-frequency RMR being the resources comprising all serving-cell or serving-beam dedicated transmissions to this UE; intra-frequency RMR being the resources of the maximum UE bandwidth in specific time resource, wherein the specific time source may be a specific subframe or radio frame and the maximum UE bandwidth may be maximum UE RF bandwidth or UE bandwidth capability and comprise all serving-cell or serving-beam dedicated transmissions to this UE, even when the serving-cell/beam transmissions are over a smaller bandwidth in the same time resource; the intra-frequency RMR comprising resources for at least one CSI-RS resource group, wherein the CSI-RS resource group may be a group of radio resources which contain CSI-RS signals and a CSI-RS resource group may also be characterized by a group-specific ID being used in the SCI-RS sequence; the intra-frequency RMR matching channel raster; and the intra-frequency RMR matching synchronization raster, wherein the intra-frequency RMR contains at least one synchronization raster points.

Examples of the signaling/indication from another node, such as another UE or a network node which needs to determine the intra-frequency RMR prior to signaling, include but are not limited to the determination in the node also being based on a rule or signaling from another node, wherein the another node may be operation and maintenance node (OM) or self-organizing network node (SON); a UE bandwidth capability; a specific UE capability related to intra-frequency RMR which may also be taken into account by the node; the signaling or message comprising one or more of SS configuration information, CSI-RS group configuration information, identifier or indicator of one of the plurality of CSI-RS groups, an identifier or indicator of one of the plurality of SS configurations, an identifier of paging resources which is associated with RMR, an indicator uniquely associated with intra-frequency RMR or which can be used to determine or derive intra-frequency RMR, an indicator or identity associated with a group of SS blocks on the same frequency resources, wherein multiple SS blocks in frequency may be associated with different identity.

The UE may also assume a pre-defined location in frequency unless it obtains a different intra-frequency RMR via signaling. The pre-defined location in frequency may be frequency resources comprising a DC carrier or certain RBs but not exceeding the UE RF bandwidth capability which may be smaller than the carrier bandwidth.

The signaling herein may comprise higher-layer signaling, physical layer signaling, or the combination of the two and may be via dedicated signaling, multicast or broadcast.

In another embodiment, a network node determines the intra-frequency RMR and provides the intra-frequency RMR configuration to another node, e.g., another network node or another UE.

In another embodiment, the intra-frequency RMR may be allowed to use only one or more specific numerologies, such as subcarrier spacing, from a larger set of numerologies supported for other transmissions, such as data, control, in the frequency band in question. For example, a reference numerology of the frequency band or the numerology used by SS blocks may be used in this frequency band.

If the UE numerology of the intra-frequency RMR is known or can be determined by a rule such as above, the network does not need to explicitly indicate the numerology in the intra-frequency RMR.

In another embodiment, the numerology of the intra-frequency RMR is signaled/indicated to the UE by the network.

Regarding the intra-frequency RMR and UE capability, different UEs may be capable of operating intra-frequency RMR of different sizes. In one example, the above UE capability may comprise UE RF bandwidth capability, UE measurement bandwidth capability, UE capability to support intra-frequency operation on specific RMR resources, etc. This capability may be used to determine the intra-frequency RMR.

If the intra-frequency RMR is received from/configured by another node, the UE may also adjust (e.g., reduce the bandwidth of intra-frequency RMR) the received/configured intra-frequency RMR to its capability, which is useful especially when the other node may be not aware of the UE capability.

Such UE capability may be signaled to a network node, e.g., upon a triggering event, condition, or upon a request from the network. Upon receiving such UE capability, the network node may use this capability to configure the intra-frequency RMR.

Regarding methods of using the determined intra-frequency reference frequency, in yet another embodiment, based on the determined frequency resources for intra-frequency operation, the UE and/or network node performs one or any combination of the following operations (1) to (7).

(1) Determining whether a neighbor cell (cell2) is an intra- or inter-frequency, including: if the center frequency of the measurement resources (e.g. RMR) in cell2 is the same as the center frequency of the RMR in cell1 then cell2 is considered by the UE as an intra-frequency cell with respect to the serving cell, cell1. Otherwise cell2 is considered as inter-frequency cell by the UE; and if the center frequencies of the measurement resources (e.g. RMR) in cell2 and the center frequencies of the measurement resources (e.g. RMR) in cell1 are within a certain margin (e.g. deltaF) then cell2 is considered by the UE as an intra-frequency cell. Otherwise cell2 is considered as inter-frequency cell by the UE.

(2) Differentiating between intra- and inter-frequency operation. For example, performing differently intra- and inter-frequency operations, performing at least one different step for intra- and inter-frequency operation, operating while meeting intra-frequency and inter-frequency requirements that are different for the same type of operation such as radio measurements. An operation involves at least some of the operation resources or all of the operation resources not comprised in intra-frequency RMR when same or larger than a threshold which may be 1 RB or Y number of RBs, 5% of RBs or Z% of BW of the operation.

(3) Configuring its bandwidth. For example, measurement BW or RF BW are configured to comprise intra-frequency RMR.

(4) Configuring its transmission. For example, in TDD-like operation, the UE transmission bandwidth comprises intra-frequency RMR.

(5) Configuring UE measurements or controlling UE measurement configuration. For example, the intra-frequency measurement configuration is configured to be within the intra-frequency RMR.

(6) Adapting scheduling of transmissions and/or receptions. For example, DL transmission scheduling at network node, DL reception scheduling at UE, UL transmission scheduling at UE, and UL reception scheduling at network node, so that the scheduled resources match with intra-frequency RMR which means that the scheduled resources do not fall beyond or do not exceed in the frequency domain.

(7) Adapting the measurement procedure for performing measurement on the neighbor cell/beam based on whether the determined neighbor cell/beam is an intra-frequency or inter-frequency in the previous steps. Examples of adaptation of the measurement procedure are using a first measurement procedure (P1) for performing measurement on the neighbor cell if the neighbor cell is an intra-frequency cell, and/or using a second measurement procedure (P2) for performing measurement on the neighbor cell if the neighbor cell is an inter-frequency cell.

Examples of P1 include but are not limited to performing the measurement without gaps; performing the measurement using a first measurement sampling rate (R1); performing the measurement over a first measurement time (T1), wherein T1=200 ms; and performing the measurement over a first measurement time (T1) while meeting a first measurement accuracy (A1), wherein A1=±3 dB for RSRP measurement.

Examples of P2 include but are not limited to performing the measurement using a second measurement sampling rate (R2), wherein R2<R1; performing the measurement over a second measurement time (T2), wherein T2>T1 and T2=800 ms while T1=200 ms; performing the measurement over a second measurement time (T2) while meeting a second measurement accuracy (A2), wherein magnitude of A2 is larger than the magnitude of A1, for example, A2=±6 dB for RSRP measurement; and performing the measurement in measurement gaps, for example, configuring UE measurement gaps for inter-frequency operation or for the operation which is not intra-frequency is based on determining that the operation is not intra-frequency since it involved resources which is not comprised in intra-frequency RMR, for another example, the configured measurement gap pattern may be different, due to different periodicity or gap length, for intra-frequency operation if an intra-frequency operation needs gaps.

The network may create assistance data, based on the determined intra-frequency RMR, e.g., create neighbor cell lists for intra-frequency operation and/or neighbor cell lists for inter-frequency operation.

The network node may use the intra-frequency RMR information/configuration determined by itself or by the UE when receiving it from the UE.

The UE or network node may further use the results of the performed intra-frequency and/or inter-frequency operations for performing one or more operational tasks. Examples of task include but are not limited to using the measurement for cell change operation or mobility; reporting the measurement results to another node, wherein the another mode may be a network node or another UE; and using the measurement for positioning.

The network node and UE may also potentially configure and use the intra-frequency/inter-frequency RMR information to configure the UE with carrier aggregation. The inter-frequency resources or non-intra-frequency resources may be considered for aggregation with serving cell resources in order to enhance UE performance and achieve carrier aggregation gain from those currently inter-frequency resources. The inter-frequency RMR or non-intra-frequency RMR may thus be viewed as candidate frequency resources for carrier aggregation.

Figure 14:
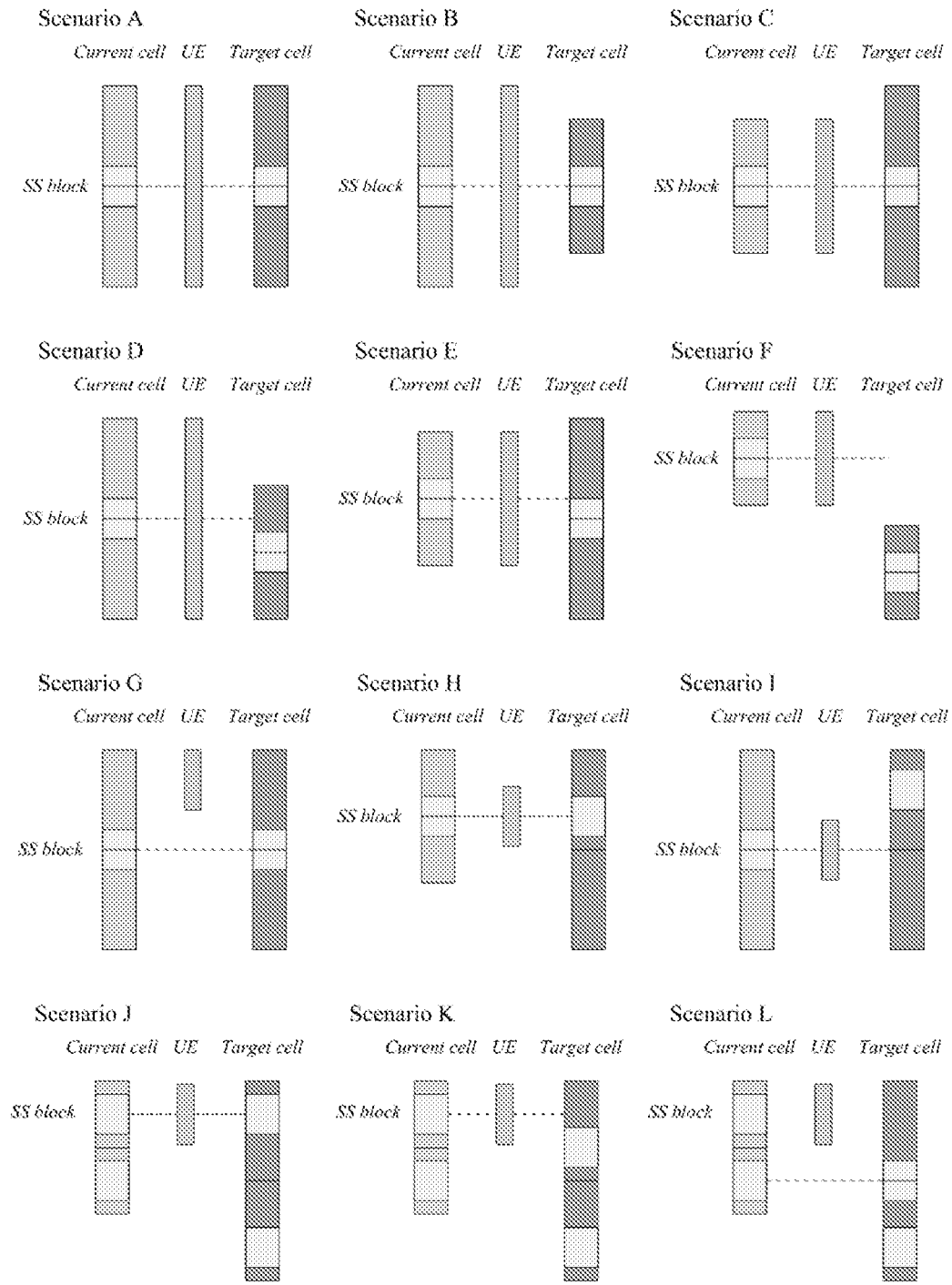
FIG. 14 illustrates multiple measurement scenarios of intra-frequency and inter-frequency UE operations, in accordance with certain embodiments.

FIG. 14 illustrates multiple measurement scenarios of intra-frequency and inter-frequency UE operations, in accordance with certain embodiments. In some embodiments, the UE may be the user equipment which is further described in FIGS. 15 and 17. The UE determines whether a particular cell measurement needs to be performed in a transmission/reception gap and the scheduler needs to know whether gaps are needed.

FIG. 14 shows multiple scenarios illustrating whether the target cell operates on an intra-frequency or inter-frequency carrier and whether the measurement is non-gap assisted or gap assisted. In certain embodiments, the current cell may be a first serving cell, and the target cell may be a second serving cell. In some embodiments, UE determines one or a set of RMR belonging to a first serving cell (cell1) used as a reference for intra-frequency operations. In another embodiment, the determination may be based on one or more of: a rule or a signaling/indication from network. The UE may also be configured with two or more serving cells, for example, cell1, cell2, cell3 and so on. For each serving cell, the UE will obtain a corresponding RMR and determine corresponding intra-frequency cells independently.

Regarding Scenario A, the current cell and the target cell have same SS burst set carrier frequency and cell bandwidths. Scenario A is an intra-frequency scenario and is not measurement gap assisted.

Regarding Scenario B, the current cell and the target cell have same SS burst set carrier frequency, and the bandwidth of the target cell is smaller than the bandwidth of the current cell. Scenario B is an intra-frequency scenario and is not measurement gap assisted.

Regarding Scenario C, the current cell and the target cell have same SS burst set carrier frequency, and the bandwidth of the target cell is larger than the bandwidth of the current cell. Scenario C is an intra-frequency scenario and is not measurement gap assisted.

Regarding Scenario D, the current cell and the target cell have different SS burst set carrier frequencies, and the bandwidth of the target cell is smaller than the bandwidth of the current cell and the bandwidth of the target cell is within bandwidth of the current cell. Scenario D is an inter-frequency scenario and is measurement gap-assisted.

Regarding Scenario E, the current cell and the target cell have different SS burst set carrier frequencies, and the bandwidth of the target cell is larger than the bandwidth of the current cell and the bandwidth of the current cell is within bandwidth of the target cell. Scenario E is an inter-frequency scenario and is measurement gap-assisted.

Regarding Scenario F, the current cell and the target cell have different SS burst set carrier frequencies and non-overlapping bandwidth. Scenario F is an inter-frequency scenario and is measurement gap-assisted.

Regarding Scenario G, the current cell and the target cell have same SS burst set carrier frequency, and the operating frequency of UE is not guaranteed to be aligned with the center frequency of the current cell. Scenario G is an intra-frequency scenario and is measurement gap assisted.

Regarding Scenario H, the current cell and the target cell have same SS burst set carrier frequency. Scenario H is an intra-frequency scenario and is not measurement gap assisted.

Regarding Scenario I, the current cell and the target cell have different SS burst set carrier frequency. Scenario I is an inter-frequency scenario and is measurement gap assisted.

Regarding Scenario J, the current cell and the target cell have multiple SS burst sets with at least one of the SS burst set of each cell sharing the same carrier frequency. Scenario J is an intra-frequency scenario and is not measurement gap assisted.

Regarding Scenario K, the current cell and the target cell have multiple SS burst sets scenario without any SS burst set of each cell sharing the same carrier frequency. Scenario K is an inter-frequency scenario and is measurement gap assisted.

Regarding Scenario L, the current cell and the target cell have multiple SS burst sets scenario with at least one of the SS burst set of each cell sharing the same carrier frequency whilst UE is not located on any of this/these SS burst set(s). Scenario L is an intra-frequency scenario and is measurement gap assisted.

Figure 15:
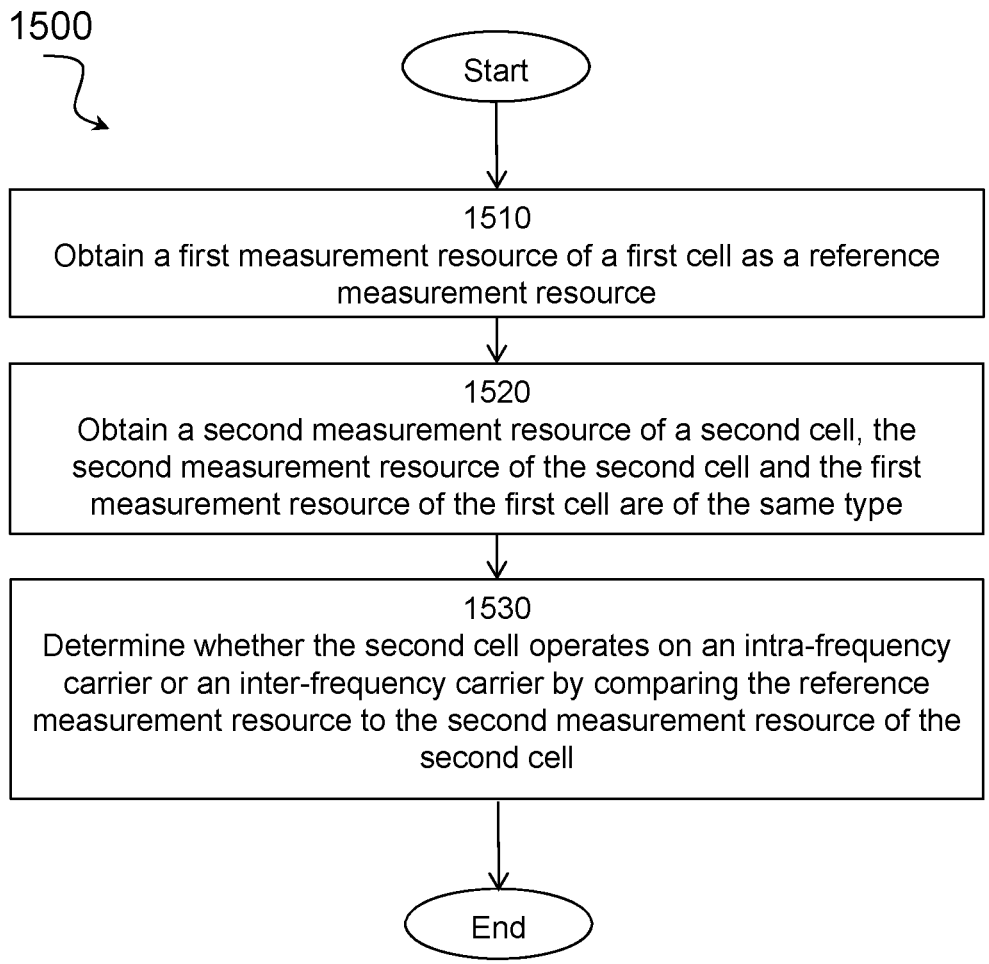
FIG. 15 illustrates a flow diagram of a method in a user equipment, in accordance with certain embodiments.

FIG. 15 is a flow diagram of a method in a user equipment, in accordance with certain embodiments. Method 1500 begins at step 1510 with a user equipment obtaining a first measurement resource of a first cell. In certain embodiments, the first cell may be a first serving cell (cell1). In some embodiments, the first measurement resource may be considered as a reference measurement resource. In some embodiments, the user equipment may be the wireless device depicted in FIG. 4. In some embodiments, the user equipment may be the user equipment shown in FIG. 5.

At step 1520, the user equipment obtains a second measurement resource of a second cell, and the second measurement resource of the second cell and the first measurement resource of the first cell are of the same type. In certain embodiments, the second cell may be a second serving cell (cell2). In certain embodiments, the user equipment may obtain measurement resources of one or more neighbor cells. In some embodiments, the neighbor cell may be a third serving cell (cell3). In certain embodiments, the measurement resources may comprise SS block or CSI-RS. In certain embodiments, the UE obtains information about the RMR based on an indication received from a network node.

At step 1530, the user equipment determines whether the second cell operates on an intra-frequency carrier or an inter-frequency carrier by comparing the reference measurement resource to the second measurement resource of the second cell. In some embodiments, the user equipment may further determine whether the one or more neighbor cells operate on an intra-frequency carrier or an inter-frequency carrier by comparing a corresponding reference measurement resource to the measurement resources of the one or more neighbor cells individually. In some embodiments, the user equipment may perform intra-frequency operations on the second cell when a frequency of the second measurement resource of the second cell is the same as a frequency of the reference measurement resource. In some embodiments, the user equipment may perform inter-frequency operations on the second cell when a frequency of the second measurement resource of the second cell is not the same as a frequency of the reference measurement resource. In some embodiments, the user equipment may further determine whether a measurement gap assistance is needed. In some embodiments, the measurement gap assistance is needed when a center frequency of the first cell is different from a center frequency of the second cell. In some embodiments, the measurement gap assistance is needed when a center frequency of the first cell is within a first margin of a center frequency of the second cell. In certain embodiments, the user equipment may further adapt a measurement procedure in response to the determination of whether the second cell operates on an intra-frequency carrier or an inter-frequency carrier.

Figure 16:
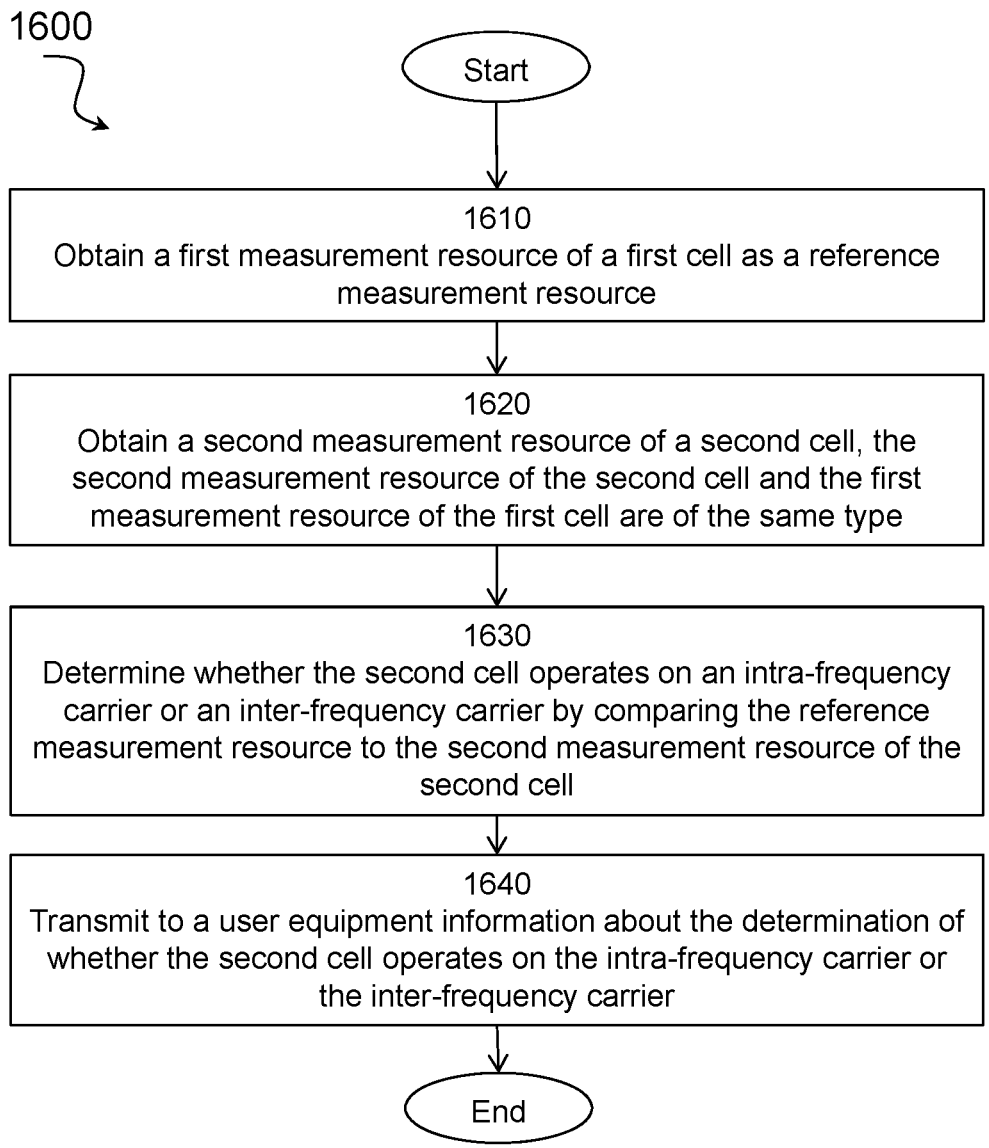
FIG. 16 illustrates a flow diagram of another method in a network node, in accordance with certain embodiments.

FIG. 16 is a flow diagram of another method in a network node, in accordance with certain embodiments. Method 1600 begins at step 1610 with the network node obtaining a first measurement resource of a first cell. In certain embodiments, the first cell may be a first serving cell (cell1). In some embodiments, the first measurement resource may be used as a reference measurement resource. In some embodiments, the network node may be the network node depicted in FIG. 4.

At step 1620, the network node obtains a second measurement resource of a second cell, and the second measurement resource of the second cell and the first measurement resource of the first cell are of the same type. In certain embodiments, the second cell may be a second serving cell (cell2). In some embodiments, the network node may obtain measurement resources of one or more neighbor cells. In some embodiments, the neighbor cell may be a third serving cell (cell3). In certain embodiments, the measurement resources may comprise SS block or CSI-RS.

At step 1630, the network node determines whether the second cell operates on an intra-frequency carrier or an inter-frequency carrier by comparing the reference measurement resource to the second measurement resource of the second cell. In some embodiments, the network node may further determine whether the one or more neighbor cells operate on an intra-frequency carrier or an inter-frequency carrier by comparing a corresponding reference measurement resource to the measurement resources of the one or more neighbor cells individually. In certain embodiments, the network node may further adapt a measurement configuration transmitted to the UE in response to the determination of whether the second cell operates on an intra-frequency carrier or an inter-frequency carrier. In certain embodiments, the network node may further adapt a scheduling of signals in uplink and/or downlink to the UE in response to the determination of whether the second cell operates on the intra-frequency carrier or the inter-frequency carrier.

At step 1640, the network node transmits to a user equipment information about the determination of whether the second cell operates on an intra-frequency carrier or an inter-frequency carrier. In some embodiments, the network node transmits the first measurement resource of the first cell, the second measurement resource of the second cell, and any possible measurement resources of any other neighbor cells to the user equipment for the determination of whether the second cell operates on an intra-frequency carrier or an inter-frequency carrier. In certain embodiments, the network node may transmit information about the obtained RMR to the UE. In certain embodiments, the network node may transmit the measurement configuration to the UE. In certain embodiments, the network node may transmit the scheduling of signals in uplink and/or downlink to the UE.

Figure 17:
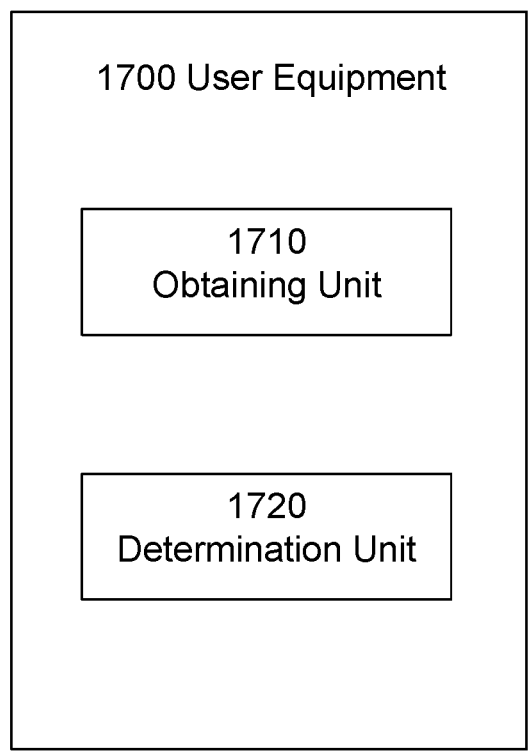
FIG. 17 illustrates a block schematic of an exemplary user equipment, in accordance with certain embodiments.

FIG. 17 is a schematic block diagram of an exemplary user equipment, in accordance with certain embodiments. The user equipment 1700 may be used in a wireless network (for example, the wireless network shown in FIG. 4). The user equipment 1700 may be implemented in a wireless device or network node (e.g., wireless device 410 or network node 460 shown in FIG. 4). User equipment 1700 is operable to carry out the example method described with reference to FIG. 15 and possibly any other processes or methods disclosed herein. It is also to be understood that the method of FIG. 15 is not necessarily carried out solely by user equipment 1700. At least some operations of the method can be performed by one or more other entities.

User equipment 1700 may comprise processing circuitry, which may include one or more microprocessor or microcontrollers, as well as other digital hardware, which may include digital signal processors (DSPs), special-purpose digital logic, and the like. In some embodiments, the processing circuitry of user equipment 1700 may be the processing circuitry shown in FIG. 4. In some embodiments, the processing circuitry of user equipment 1700 may be the processor shown in FIG. 5. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining unit 1710 and determination unit 1720, and any other suitable units of user equipment 1700 to perform corresponding functions according one or more embodiments of the present disclosure.

As illustrated in FIG. 17, user equipment 1700 includes obtaining unit 1710 and determination unit 1720. The obtaining unit 1710 may be configured to obtain a first measurement resource of a first cell. In some embodiments, the first measurement resource may be considered as a reference measurement resource. In certain embodiments, the first cell may be a first serving cell (cell1). The obtaining unit 1710 may be configured to obtain a second measurement resource of a second cell, and the second measurement resource of the second cell and the first measurement resource of the first cell are of the same type. In certain embodiments, the second cell may be a second serving cell (cell2). In certain embodiments, the obtaining unit 1710 may obtain measurement resources of one or more neighbor cells. In some embodiments, the neighbor cell may be a third serving cell (cell3). In certain embodiments, the measurement resources may comprise SS block or CSI-RS. In certain embodiments, the UE obtains information about the RMR based on an indication received from a network node.

Determination unit 1720 may be configured to determine whether the second cell operates on an intra-frequency carrier or an inter-frequency carrier by comparing the reference measurement resource to the second measurement resource of the second cell. In some embodiments, the determination unit 1720 may further determine whether one or more neighbor cells operate on an intra-frequency carrier or an inter-frequency carrier by comparing a corresponding reference measurement resource to the measurement resources of the one or more neighbor cells individually. In certain embodiments, the user equipment may further adapt a measurement procedure in response to the determination of whether the second cell operates on an intra-frequency carrier or an inter-frequency carrier.

Figure 18:
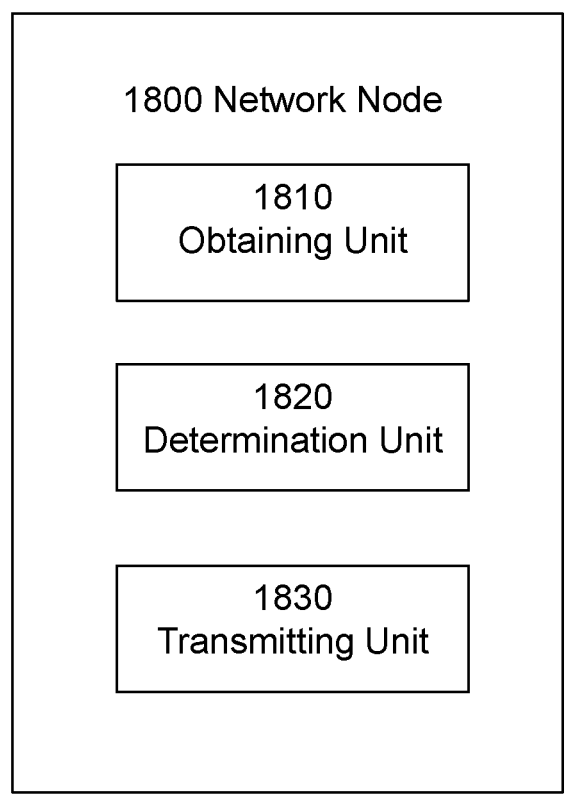
FIG. 18 illustrates a block schematic of an exemplary network node, in accordance with certain embodiments.

FIG. 18 is a schematic block diagram of an exemplary network node, in accordance with certain embodiments. The network node 1800 may be used in may be used in a wireless network (for example, the wireless network shown in FIG. 4). The network node 1800 may be implemented in a wireless device (e.g., wireless device 410 shown in FIG. 4). The network node 1800 is operable to carry out the example method described with reference to FIG. 16 and possibly any other processes or methods disclosed herein. It is also to be understood that the method of FIG. 16 is not necessarily carried out solely by the network node 1800. At least some operations of the method can be performed by one or more other entities.

Network node 1800 may comprise processing circuitry, which may include one or more microprocessor or microcontrollers, as well as other digital hardware, which may include digital signal processors (DSPs), special-purpose digital logic, and the like. In some embodiments, the processing circuitry of the network node 1800 may be the processing circuitry 470 shown in FIG. 4. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining unit 1810, determination unit 1820, transmitting unit 1830, and any other suitable units of network node 1800 to perform corresponding functions according one or more embodiments of the present disclosure.

As illustrated in FIG. 18, network node 1800 includes obtaining unit 1810, determination unit 1820, and transmitting unit 1830. Obtaining unit 1810 may be configured to obtain a first measurement resource of a first cell. In certain embodiments, the first cell may be a first serving cell (cell1). In some embodiments, the first measurement resource may be considered as a reference measurement resource. The obtaining unit 1810 may be configured to obtain a second measurement resource of a second cell, and the second measurement resource of the second cell and the first measurement resource of the first cell are of the same type. In certain embodiments, the second cell may be a second serving cell (cell2). In certain embodiments, the obtaining unit 1810 may obtain measurement resources of one or more neighbor cells. In some embodiments, the neighbor cell may be a third serving cell (cell3). In certain embodiments, the measurement resources may comprise SS block or CSI-RS.

Determination unit 1820 may be configured to determine whether the second cell operates on an intra-frequency carrier or an inter-frequency carrier by comparing the reference measurement resource to the second measurement resource of the second cell. In some embodiments, the determination unit 1820 may further determine whether one or more neighbor cells operate on an intra-frequency carrier or an inter-frequency carrier by comparing the reference measurement resource to the one or more measurement resources of the one or more neighbor cells individually.

Transmitting unit 1830 may be configured to transmit to a user equipment the determination of whether the second cell operates on an intra-frequency carrier or an inter-frequency carrier. In some embodiments, the transmitting unit 1830 may transmit the first measurement resource of the first cell, the second measurement resource of the second cell, and any possible measurement resources of any other neighbor cells to the user equipment for the determination of whether the second cell operates on an intra-frequency or an inter-frequency. In certain embodiments, the transmitting unit 1830 may transmit information about the obtained RMR to the UE. In certain embodiments, the transmitting unit 1830 may transmit the measurement configuration to the UE in response to the determination of whether the second cell operates on an intra-frequency carrier or an inter-frequency carrier. In certain embodiments, the transmitting unit 1830 may transmit the scheduling of signals in uplink and/or downlink to the UE in response to the determination of whether the second cell operates on an intra-frequency carrier or an inter-frequency carrier.

The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

According to various embodiments, an advantage of features herein is that redundant data can be discarded before it is transmitted over the air interface thus saving valuable bandwidth. Another advantage is that a DU that has a temporal loss of coverage can clear its buffer of redundant data and be ready to transmit new data as soon as coverage is restored.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for use in a user equipment (UE) comprising:
obtaining a first measurement resource of a first cell as a reference measurement resource;
obtaining a second measurement resource of a second cell, the second measurement resource of the second cell and the first measurement resource of the first cell are associated with a synchronization signal (SS) block; and
determining whether the second cell operates on an intra-frequency carrier or an inter-frequency carrier by comparing the reference measurement resource to the second measurement resource of the second cell.

2. The method according to claim 1, further comprising performing intra-frequency operations on the second cell when a frequency of the second measurement resource of the second cell is the same as a frequency of the reference measurement resource.

3. The method according to claim 1, further comprising performing inter-frequency operations on the second cell when a frequency of the second measurement resource of the second cell is not the same as a frequency of the reference measurement resource.

4. The method according to claim 1, further comprising determining whether a measurement gap assistance is needed.

5. The method according to claim 4, wherein the measurement gap assistance is needed when a center frequency of the first cell is different from a center frequency of the second cell.

6. The method according to claim 1, further comprising performing intra-frequency operations on the second cell when at least one synchronization signal burst of the first cell shares the same frequency with at least one synchronization signal burst of the second cell.

7. The method according to claim 1, further comprising performing inter-frequency operations on the second cell when no synchronization signal bursts of the first cell shares the same frequency with any synchronization signal burst of the second cell.

8. The method according to claim 1, wherein determining whether the second cell operates on the intra-frequency carrier or the inter-frequency carrier is based on, at least in part, a predefined location in frequency.

9. The method according to claim 1, wherein determining whether the second cell operates on the intra-frequency carrier or the inter-frequency carrier is based, at least in part, on an indication from a network node or from another UE.

10. The method according to claim 1, further comprising obtaining information about the reference measurement resource based on an indication received from a network node.

11. The method according to claim 1, wherein the first and second measurement resources comprise SS block or CSI-RS.

12. The method according to claim 1, further comprising adapting a measurement procedure in response to the determination of whether the second cell operates on the intra-frequency carrier or the inter-frequency carrier.

13. A user equipment for determining intra-frequency operations and inter-frequency operations, comprising:
at least one processing circuitry; and
at least one storage that stores processor-executable instructions, when executed by the processing circuitry, causes the user equipment to:
obtain a first measurement resource of a first cell as a reference measurement resource;
obtain a second measurement resource of a second cell, the second measurement resource of the second cell and the first measurement resource of the first cell are associated with a synchronization signal (SS) block; and
determine whether the second cell operates on an intra-frequency carrier or an inter-frequency carrier by comparing the reference measurement resource to the second measurement resource of the second cell.

14. The user equipment according to claim 13, wherein the instructions further cause the user equipment to perform the intra-frequency operations on the second cell when a frequency of the second measurement resource of the second cell is the same as a frequency of the reference measurement resource.

15. The user equipment according to claim 13, wherein the instructions further cause the user equipment to perform the inter-frequency operations on the second cell when a frequency of the second measurement resource of the second cell is not the same as a frequency of the reference measurement resource.

16. The user equipment according to claim 13, wherein the instructions further cause the user equipment to determine whether a measurement gap assistance is needed.

17. The user equipment according to claim 16, wherein the measurement gap assistance is needed when a center frequency of the first cell is different from a center frequency of the second cell.

18. The user equipment according to claim 13, wherein the instructions further cause the user equipment to perform the intra-frequency operations on the second cell when at least one synchronization signal burst of the first cell shares the same frequency with at least one synchronization signal burst of the second cell.

19. The user equipment according to claim 13, wherein the instructions further cause the user equipment to perform the inter-frequency operations on the second cell when no synchronization signal bursts of the first cell shares the same frequency with any synchronization signal burst of the second cell.

20. The user equipment according to claim 13, wherein the determination of whether the second cell operates on the intra-frequency carrier or the inter-frequency carrier is based, at least in part, on a predefined location in frequency.

21. The user equipment according to claim 13, wherein the determination of whether the second cell operates on the intra-frequency carrier or the inter-frequency carrier is based, at least in part, on an indication from a network node or from another UE.

22. The user equipment according to claim 13, further comprising obtaining information about the reference measurement resource based on an indication received from a network node.

23. The user equipment according to claim 13, wherein the first and second measurement resources comprise SS block or CSI-RS.

24. The user equipment according to claim 13, wherein the instructions further cause the user equipment to adapt a measurement procedure in response to the determination of whether the second cell operates on the intra-frequency carrier or the inter-frequency carrier.

25. A communication system for determining intra-frequency operations and inter-frequency operations, the communication system comprising:
  a network node comprising at least one processing circuitry configured to:
    obtain a first measurement resource of a first cell as a reference measurement resource;
    obtain a second measurement resource of a second cell, the second measurement resource of the second cell and the first measurement resource of the first cell are associated with a synchronization signal (SS) block; and
    transmit to a user equipment the reference measurement resource and the second measurement resource of the second cell; and
  a user equipment within a network comprising at least one processing circuitry configured to:
    receive the reference measurement resource and the second measurement resource of the second cell from the network node; and
    determine whether the second cell operates on an intra-frequency carrier or an inter-frequency carrier by comparing the reference measurement resource to the second measurement resource of the second cell.

* * * * *